United States Patent
Coppola et al.

(10) Patent No.: US 11,639,720 B2
(45) Date of Patent: May 2, 2023

(54) CLUTCHED VACUUM PUMP SYSTEM

(71) Applicant: LITENS AUTOMOTIVE PARTNERSHIP, Woodbridge (CA)

(72) Inventors: Gianmarc Coppola, Concord (CA); Kody Orr, Etobicoke (CA); Sean Kieran, Toronto (CA); Julian Pires, Etobicoke (CA); Andrew M Boyes, Aurora (CA)

(73) Assignee: LITENS AUTOMOTIVE PARTNERSHIP, Woodbridge, CA (US)

( * ) Notice: Subject to any disclaimer, the term of this patent is extended or adjusted under 35 U.S.C. 154(b) by 568 days.

(21) Appl. No.: 16/482,002

(22) PCT Filed: Jan. 29, 2018

(86) PCT No.: PCT/CA2018/050103
§ 371 (c)(1),
(2) Date: Jul. 30, 2019

(87) PCT Pub. No.: WO2018/137045
PCT Pub. Date: Aug. 2, 2018

(65) Prior Publication Data
US 2020/0018312 A1    Jan. 16, 2020

Related U.S. Application Data

(60) Provisional application No. 62/590,629, filed on Nov. 26, 2017, provisional application No. 62/506,355, (Continued)

(51) Int. Cl.
*F04C 29/00* (2006.01)
*F04C 25/02* (2006.01)
(Continued)

(52) U.S. Cl.
CPC ............ *F04C 29/005* (2013.01); *F04C 25/02* (2013.01); *F16D 13/08* (2013.01); *F04C 2270/035* (2013.01); *F16D 3/10* (2013.01)

(58) Field of Classification Search
CPC .. F04C 29/005; F04C 25/02; F04C 2270/035; F04C 18/344; F04C 29/0071;
(Continued)

(56) References Cited

U.S. PATENT DOCUMENTS 4,221,284 A * 9/1980 Hoff ........................ F16D 13/08
192/12 BA
4,715,800 A    12/1987 Kazutoshi et al.
(Continued)

FOREIGN PATENT DOCUMENTS

CN    202368564 U    8/2012
DE    4427391 A1    2/1995
(Continued)

OTHER PUBLICATIONS

WABCO Air Compressor—Integrated Pnuematic Clutch—2016 Brouchure.
(Continued)

*Primary Examiner* — Bryan M Lettman
(74) *Attorney, Agent, or Firm* — Aird & McBurney LP

(57) ABSTRACT

A system is provided for generating vacuum in a vehicle. The system includes a vacuum pump, an engagement clutch, an actuator, and a torque limiting clutch. The engagement clutch operatively connects a camshaft to the rotor. The actuator controls the clutch. The actuator is movable, based on air pressure in a vacuum conduit, between a low-pressure position in which the actuator causes the clutch to operatively disconnect the camshaft from the rotor, and a high-pressure position in which the actuator causes the clutch to operatively connect the camshaft to the rotor. The torque
(Continued)

limiting clutch limits torque transfer to the rotor when the engagement clutch operatively connects the camshaft to the rotor. The system also provides control for hysteresis.

15 Claims, 26 Drawing Sheets

Related U.S. Application Data filed on May 15, 2017, provisional application No. 62/451,897, filed on Jan. 30, 2017.

(51) Int. Cl.
*F16D 13/08* (2006.01)
*F16D 3/10* (2006.01)

(58) Field of Classification Search
CPC .. F04C 29/0042; F04C 15/0061; F16D 13/08; F16D 3/10; F16D 41/20; F16D 41/206; F16D 2125/42; F04D 25/08; F04D 25/02
See application file for complete search history.

(56) References Cited

U.S. PATENT DOCUMENTS

| | | | |
|---|---|---|---|
| 4,979,931 A * | 12/1990 | Fleischmann | B60K 23/04 180/338 |
| 5,273,409 A | 12/1993 | Swain | |
| 5,515,676 A | 5/1996 | Earle | |
| 6,668,953 B1 | 12/2003 | Reik et al. | |
| 6,923,628 B1 | 8/2005 | Otto | |
| 8,141,527 B2 | 3/2012 | Schafer et al. | |
| 8,242,652 B2 | 8/2012 | Albert et al. | |
| 8,387,767 B2 | 3/2013 | Komorowski et al. | |
| 8,528,674 B2 | 9/2013 | Dieter et al. | |
| 9,068,603 B2 * | 6/2015 | Boyes | F16D 13/02 |
| 9,267,552 B2 | 2/2016 | Boyes et al. | |
| 9,309,840 B2 | 4/2016 | Robert et al. | |
| 9,333,958 B2 | 5/2016 | Raffaele et al. | |
| 9,333,963 B2 | 5/2016 | Srini et al. | |
| 2008/0283010 A1 | 11/2008 | Bohner et al. | |
| 2010/0122882 A1* | 5/2010 | Komorowski | F16D 27/105 192/35 |
| 2010/0207473 A1 | 8/2010 | Albert et al. | |
| 2011/0174266 A1* | 7/2011 | Cunningham | F02D 41/064 123/403 |
| 2012/0141299 A1 | 6/2012 | Junghwan et al. | |
| 2013/0313068 A1* | 11/2013 | Mevissen | B60K 25/00 192/81 C |
| 2014/0171264 A1 | 6/2014 | Srini | |
| 2014/0216881 A1 | 8/2014 | Tilly | |
| 2014/0238809 A1 | 8/2014 | Boyes et al. | |
| 2014/0290406 A1 | 10/2014 | Jeffrey | |
| 2014/0321966 A1 | 10/2014 | Bryan et al. | |
| 2015/0044069 A1 | 2/2015 | Raffaele et al. | |
| 2015/0251644 A1 | 9/2015 | Raffaele et al. | |
| 2015/0308432 A1 | 10/2015 | Raffaele et al. | |
| 2015/0316059 A1* | 11/2015 | Warner | F04C 29/0071 418/259 |
| 2016/0040733 A1 | 2/2016 | Staniewicz et al. | |
| 2016/0115960 A1 | 4/2016 | Amaud et al. | |
| 2016/0121871 A1* | 5/2016 | Lee | B60T 13/46 701/68 |
| 2016/0305308 A1 | 10/2016 | Nowak et al. | |
| 2017/0000850 A1 | 1/2017 | Cramer et al. | |

FOREIGN PATENT DOCUMENTS

| | | |
|---|---|---|
| DE | 19854243 C2 | 10/2000 |
| DE | 10150303 A1 | 4/2003 |
| DE | 10150302 B4 | 8/2004 |
| DE | 102006027317 A1 | 12/2007 |
| DE | 102006029553 A1 | 12/2007 |
| DE | 102006030917 A1 | 12/2007 |
| DE | 19848413 B4 | 6/2009 |
| EP | 1239572 A2 | 9/2002 |
| EP | 1277960 B1 | 3/2006 |
| EP | 1830045 B1 | 5/2008 |
| EP | 1887224 B1 | 6/2011 |
| EP | 2888138 A1 | 2/2014 |
| EP | 2888497 A1 | 2/2014 |
| EP | 2543903 B1 | 3/2014 |
| EP | 2888496 B1 | 6/2016 |
| WO | 2000031419 A1 | 6/2000 |
| WO | 2004072444 A1 | 8/2004 |
| WO | 2006122515 A1 | 11/2006 |
| WO | 2007045193 A1 | 4/2007 |
| WO | 2007093581 A1 | 8/2007 |
| WO | 2010054487 A1 | 5/2010 |
| WO | 2011156902 A1 | 12/2011 |
| WO | 2013045127 A2 | 4/2013 |
| WO | 2013049919 A1 | 4/2013 |
| WO | 2013067621 A1 | 5/2013 |
| WO | 2014029444 A1 | 2/2014 |
| WO | 2014029445 A1 | 2/2014 |
| WO | 2014029446 A1 | 2/2014 |
| WO | 2015090415 A1 | 6/2015 |
| WO | 2015090416 A1 | 6/2015 |
| WO | 2016091922 A1 | 6/2016 |

OTHER PUBLICATIONS

WABCO Vacuum Pumps—for Gasoline and Diesel Engines—2016 Brouchure.
001_Pierburgh Pump-White Paper on MR Clutch Actuated Automotive Vacuum Pump—2012.
007_European EU Emission Test Cycles-ECE 15 + EUDC, NEDC Dyno Drive Test Cycle.
003_Pierburgh Pump-Vacuum Pump Brochure2.
000_ IP Search (INA, Schaeffler + Vacuum Pump)—x59 Docs—Aug. 10, 2016.
000_ IP Search (LUK + Vacuum Pump)—x158 Docs—Aug. 10, 2016.
000_ IP Search (WABCO + Vacuum Pump)—x83 Docs—Aug. 15, 2016.
000_ IP Search (Pierburg Pump + Vacuum Pump)—x59 Docs—Aug. 10, 2016.
004_ Pierburgh Pump—Product Catalog—2010.
005_ Pierburg—VVL Variable Valve Lift System.
006_ Pierburg—Electric Drive Modules, Actuators.
Written Opinion for PCT/CA2018/050103 dated Apr. 13, 2018.
Z_ Batch File—File Name List.
International Search Report for PCT/CA2018/050103 dated Apr. 13, 2018.
Supplementary European Search Report for EP 18744367.6 dated Aug. 4, 2020.
Office Action for CN201880008740.6 dated May 28, 2020.

* cited by examiner

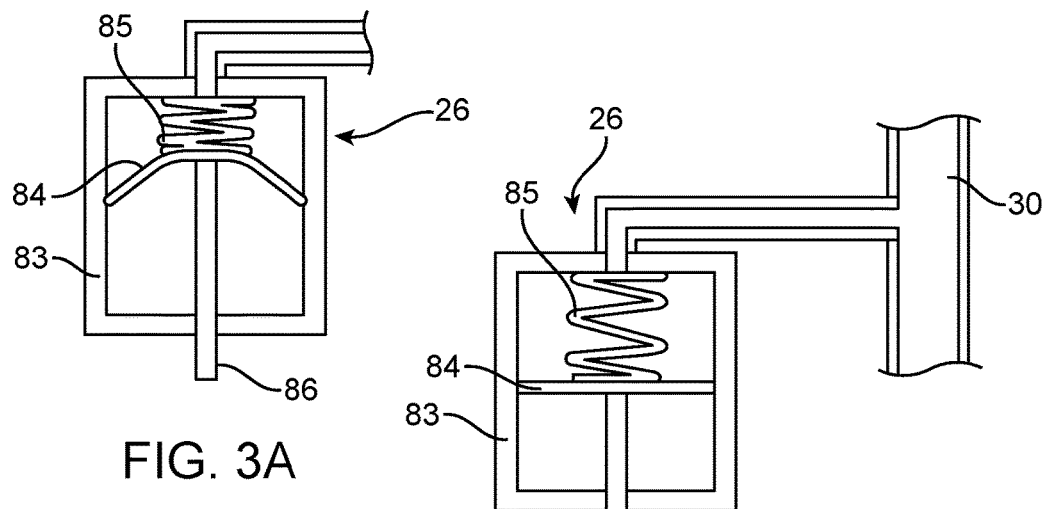
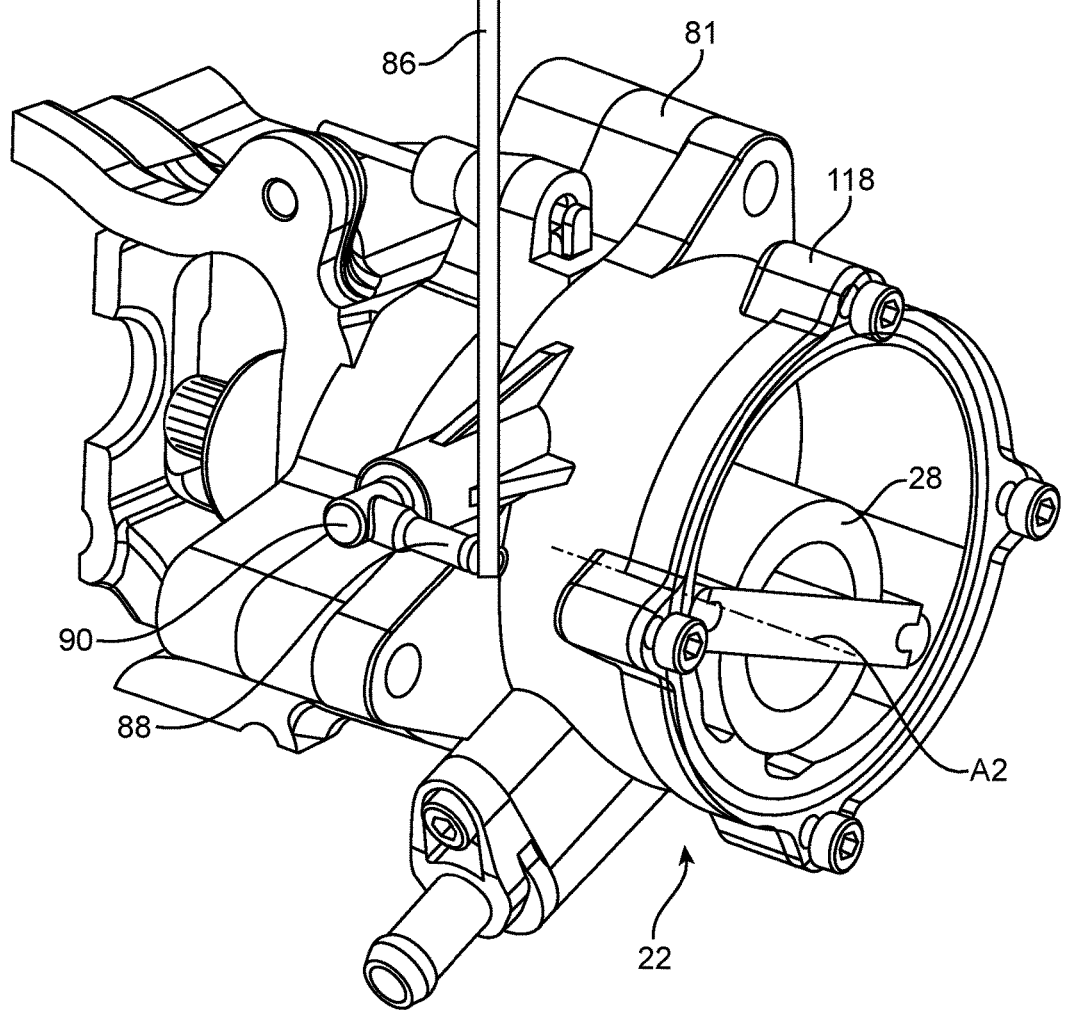
FIG. 3A
FIG. 3

CLUTCHED VACUUM PUMP SYSTEM

CROSS-REFERENCE

This application claims priority to U.S. Provisional Application No. 62/451,897 filed Jan. 30, 2017, U.S. Provisional Application No. 62/506,355 filed May 15, 2017, and U.S. Provisional Application No. 62/590,629 filed Nov. 26, 2017. The contents of these are incorporated by reference herein.

FIELD

This disclosure generally relates to mechanical clutches for transmitting power between two rotary members, and more particularly, to a clutched vacuum pump assembly and system.

BACKGROUND

It is known to transmit power between an internal combustion engine and a shaft of an accessory device to power the device. An example is an automotive vacuum pump or water pump. In some engines it can be desirable to switch the vacuum pump or water pump on or off based on demand. For example, switching the vacuum pump off when it is not needed can increase fuel efficiency. Electrical pumps have conventionally been used to implement this function; however electrical pumps can be more costly than mechanical pumps and suffer energy losses as power is converted between mechanical-electrical-mechanical work.

Clutched mechanical pumps are known. For example, U.S. Pat. No. 8,387,767, EP 1,887,224, U.S. Pat. Nos. 9,068,603 and 9,267,552 disclose electromagnetically clutched mechanical water pumps. US 2016/0121871, U.S. Pat. No. 9,333,963, US 2015/0251644 and WO 2015/090415 disclose clutched vacuum pump systems using various types of clutches such as electromagnetic, magneto-rheological and hydraulic clutches.

A more elegant clutched vacuum pump assembly and related system may be desirable.

SUMMARY

In an aspect, a system is provided for generating vacuum using an engine in a vehicle. The system includes a vacuum pump, a wrap spring clutch and a vacuum actuator. The vacuum pump has a rotor that is rotatable to generate a vacuum. The wrap spring clutch is operable to operatively connect a camshaft driven by the engine, to the rotor. The vacuum actuator is connected to a vacuum conduit in the vehicle and operatively connected to the wrap spring clutch. The vacuum actuator is movable, based on air pressure in the vacuum conduit, between a low pressure position in which the vacuum actuator causes the wrap spring clutch to operatively disconnect the camshaft from the rotor, and a high pressure position in which the vacuum actuator causes the wrap spring clutch to operatively connect the camshaft to the rotor.

In another aspect, a system is provided for generating vacuum using an engine in a vehicle. The system includes a vacuum pump, a wrap spring clutch, a clutch control member, a brake and a vacuum actuator. The vacuum pump has a rotor that is rotatable to generate a vacuum. The wrap spring clutch is positionable in an engaged position in which the wrap spring clutch operatively connects a camshaft that is driven by the engine to the rotor and a disengaged position in which the wrap spring clutch operatively disconnects the camshaft from the rotor. The wrap spring clutch is biased towards the engaged position. The clutch control member holds an end of the wrap spring clutch. The brake is positionable in a non-braking position in which the brake permits the clutch control member to be driven by the camshaft, thereby permitting the wrap spring clutch to remain in the engaged position, and in a braking position in which the brake retards rotation of the clutch control member relative to the camshaft, bringing the wrap spring clutch to the disengaged position. The vacuum actuator is connected to a vacuum conduit in the vehicle, wherein the vacuum actuator is movable between a low-pressure position and a high-pressure position based on air pressure in the vacuum conduit. The vacuum actuator is operatively connected to the brake, such that movement of the vacuum actuator to the low-pressure position positions the brake in the non-braking position, and movement of the vacuum actuator to the high-pressure position positions the brake in the braking position.

In another aspect, a system is provided for driving a rotor of an accessory that operates using oil. The system includes an input member that is driven by a power source. The system further includes a wrap spring clutch that is positionable in an engaged position in which the wrap spring clutch operatively connects the input member to the rotor to drive the rotor and a disengaged position in which the wrap spring clutch operatively disconnects the input member from the rotor such that the rotor stops. The system further includes a first oil flow path extending from an oil source to the accessory. The system further includes a second oil flow path extending from the oil source to the wrap spring clutch. The system further includes a valve member that is positionable in a first valve member position in which the valve permits oil flow in the first oil flow path, and a second valve member position in which the valve member permits oil flow in the second oil flow path. The valve member is moved to the first valve member position by driving of the rotor and is moved to the second valve member position by stoppage of the rotor.

In another aspect, a system is provided for generating vacuum using an engine in a vehicle. The system includes a vacuum pump, a clutch, an actuator, and a torque limiting clutch. The vacuum pump has a rotor that is rotatable to generate a vacuum. The clutch is operable to operatively connect a camshaft driven by the engine, to the rotor. The actuator is operatively connected to the clutch. The actuator is movable, based on air pressure in the vacuum conduit, between a low-pressure position in which the actuator causes the clutch to operatively disconnect the camshaft from the rotor, and a high-pressure position in which the actuator causes the clutch to operatively connect the camshaft to the rotor. The torque limiting clutch limits torque transfer to the rotor when the clutch operatively connects the camshaft to the rotor.

In another aspect, a pump assembly is provided. The assembly includes: a rotary input member connectable to an engine rotary power takeoff; a pump having a rotor that is rotatable to generate suction; a clutch coupling the rotary input member and the pump rotor, wherein the clutch is positionable in an engaged position, in which the clutch operatively connects the rotary input member and the pump rotor, and a disengaged position, in which the clutch operatively disconnects the rotary input member and the pump rotor; and an actuator operatively connected to the clutch, wherein the actuator is movable, between a first position in which the actuator positions the clutch in the disengaged position, and a second position in which the actuator positions the clutch in the engaged position; means for providing the assembly with setpoint hysteresis; and a torque limiting clutch that limits torque transfer to the rotor when the clutch operatively connects the rotary input member to the rotor.

In another aspect, a method of operating a vacuum system in an internal combustion engine is provided. The vacuum system includes an engine intake manifold connected to a vacuum reservoir, an oil-supplied vacuum pump connected to the vacuum reservoir, and a clutch connected between a rotary power take-off of the engine and the vacuum pump for selectively turn-on and turn-off of the vacuum pump. The method includes: operating the engine to generate vacuum via the intake manifold; engaging the clutch to turn on the vacuum pump when the pressure in a vacuum conduit is above a first pressure setpoint; disengaging the clutch to turn off the vacuum pump when the pressure in the vacuum conduit is below a second pressure setpoint that is different than the first pressure setpoint; and limiting torque applied to the vacuum pump by the rotary power takeoff when the clutch is engaged.

BRIEF DESCRIPTION OF THE DRAWINGS

The foregoing and other aspects of the invention will be better appreciated having regard to the attached drawings, wherein:

FIG. 3 is another perspective view of the assembly shown in FIG. 1, showing a vacuum actuator in a high-pressure position;

FIG. 3A is a sectional elevation view of the vacuum actuator shown in FIG. 3 in a low-pressure position;

DETAILED DESCRIPTION OF EXAMPLE EMBODIMENTS

Figure 1:
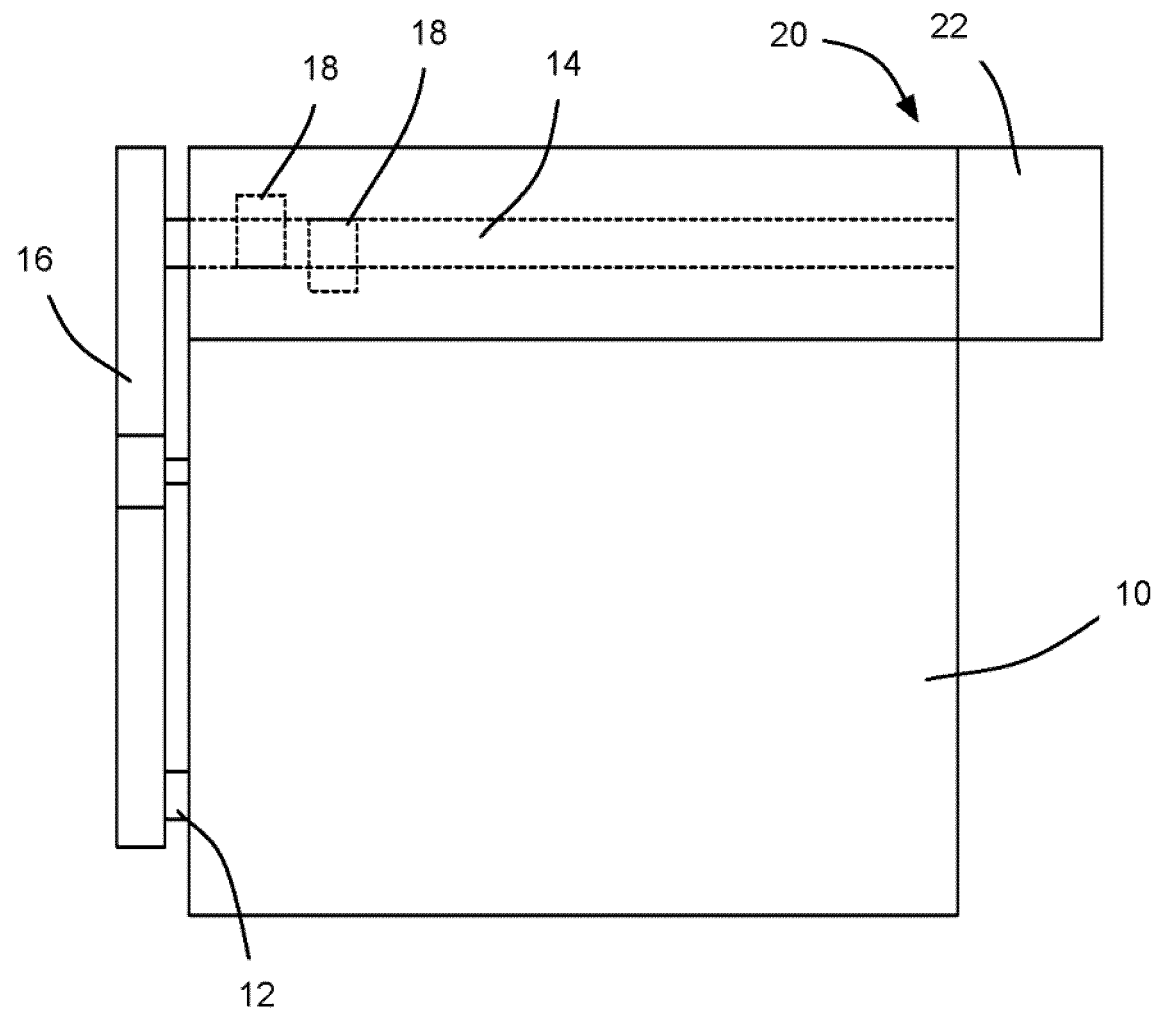
FIG. 1 is a schematic view of an engine with an endless drive arrangement including a system in accordance with an embodiment of the present disclosure.

FIG. 1 is a schematic view of a vehicular engine 10. The engine 10 includes a crankshaft 12 that drives at least one camshaft 14 via an endless drive member 16, which may be, for example, a timing belt or a timing chain. The camshaft 14 is shown with two cams 18 thereon, for illustrative purposes only. It will be understood that the actual number of cams 18 on the camshaft 14 will depend on the number of cylinders the engine has, the number of valves per cylinder and the total number of camshafts being employed to control the opening and closing of the valves, as well as other possible factors. The engine 10 is shown in a simplified format for the purposes of avoiding extraneous detail.

Figure 2:
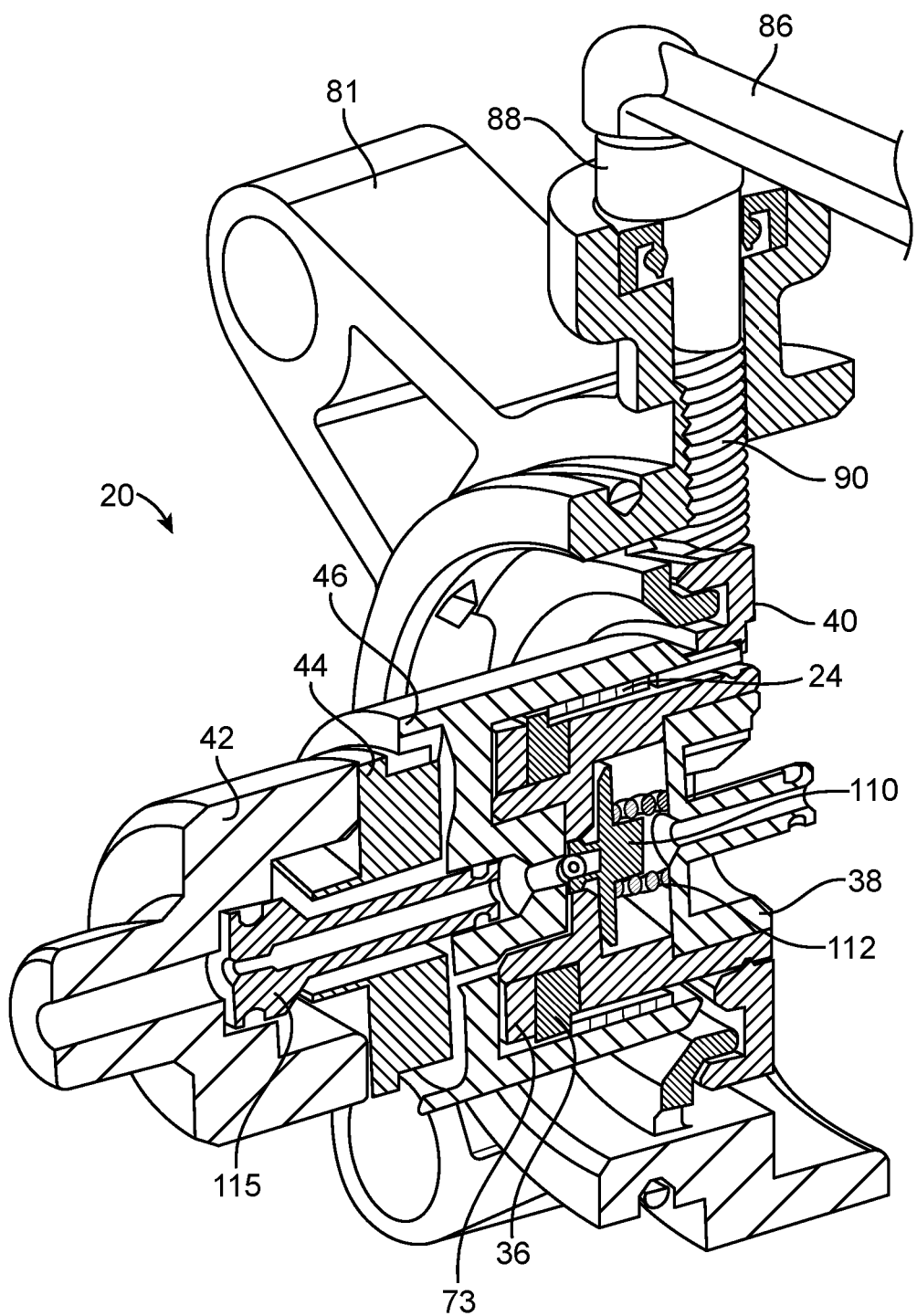
FIG. 2 is a sectional perspective view of a vacuum assembly shown in FIG. 1.

FIG. 1 shows (in schematic form) an assembly 20 for selectively generating vacuum using the engine 10 as a motive source. In some embodiments, the assembly 20 consumes less energy to generate vacuum than a conventional mechanical vacuum pump because the assembly 20 only generates vacuum when the pressure in a selected conduit is above a selected threshold. Referring additionally to FIGS. 2-3, the assembly 20 includes, in some embodiments, a vacuum pump 22 (FIG. 3), a clutch 24 (FIG. 2) operatively connected to the pump 22, and a vacuum actuator 26 (shown schematically in FIG. 3) operatively connected to the clutch 24.

As seen in FIG. 3, the vacuum pump 22 has a rotor 28 that is rotatable to generate a vacuum. In the example shown, the vacuum pump 22 is a rotary vane vacuum pump, however, it is simply one example of a suitable vacuum pump. Alternatively, any other type of vacuum pump that employs a rotor of some kind may be used.

The clutch 24 is controllable to operatively connect an engine rotary power take-off such as the camshaft 14, which is driven by the engine 10, to the rotor 28, as described in greater detail below.

The vacuum actuator 26 (FIG. 3) is connected to a vacuum conduit 30 in the vehicle. The vacuum actuator 26 is movable, based on air pressure in the vacuum conduit 30, between a low-pressure position (shown in FIG. 3A) in which the vacuum actuator 26 controls the clutch 24 to operatively disconnect the camshaft 14 and the rotor 28, and a high-pressure position (shown in FIG. 3) in which the vacuum actuator 26 controls the clutch 24 to operatively connect the camshaft 14 to the rotor 28.

Referring additionally to FIGS. 4A, 4B and 5-7, the assembly 20 may further include a rotary input member such as connector 32, a carrier 36, a driver 38, and a clutch control member 40. The connector 32 extends from the camshaft 14 and includes a camshaft adapter 42, a first transfer member 44 and a second transfer member 46. The camshaft adapter 42 mounts fixedly to the camshaft 14 in any suitable way. For example, the camshaft adapter 42 may include a splined end 48 that engages a complementarily splined aperture 50 in the camshaft 14. The first transfer member 44 includes first and second linear projections 52 and 54 on its first and second opposing ends. The projections 52 and 54 can be circumferentially offset by, for example, 90 degrees, and are received in complementary first and second slots 56 and 58 in the camshaft adapter 42 and the second transfer member 46 respectively. The projections 52 and 54 and the slots 56 and 58 permit misalignment in orthogonal radial directions, thereby permitting the assembly 20 to tolerate some amount of misalignment between the axis of rotation of the rotor 28 of the vacuum pump 22 and the axis of rotation of the camshaft 14. The axes are shown at A1 and A2 respectively. The present disclosure employs terms such as 'axial', 'radial' and 'circumferential' in general reference to the axes A1 and A2, which are expected to be at least substantially collinear.

The clutch 24 may be embodied via a wrap spring 25 and hence referred to as a wrap spring clutch 24 in such embodiments.

Figure 7:
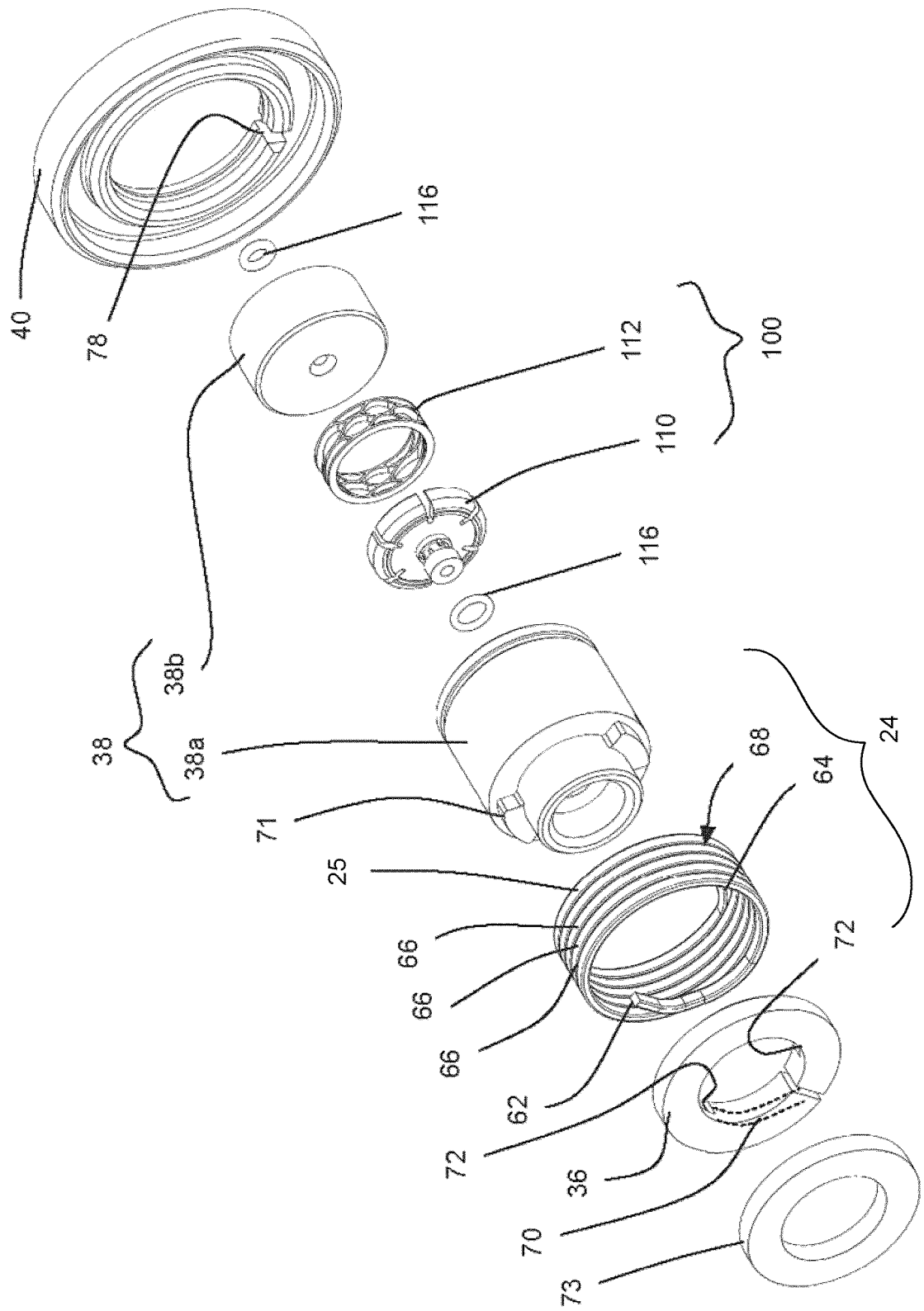
FIG. 7 is a magnified perspective exploded view of another portion of the assembly shown in FIG. 5.

As seen in FIG. 7, the wrap spring 25 has a first end 62 and a second end 64 and a plurality of coils 66 extending between the first and second ends 62 and 64. The outer surface of the coils 66 present an engagement surface 68 that is engageable with a clutch engagement surface 60 (seen in FIGS. 4A and 4B) of the second transfer member 46. In the illustrated embodiment the wrap clutch has an "opening spring" configuration wherein the engagement surface 68 is a radially outer surface of the coils 66 and the engagement surface 60 is a radially inner surface of the second transfer member 46; however in alternative embodiments the wrap clutch can have a "closing spring" configuration wherein engagement surface 68 is a radially inner surface of the coils 66 and the engagement surface 60 is a radially outer surface of the second transfer member 46.

As seen in FIG. 7, the first end 62 of the wrap spring 25 is received in a slot 70 in the carrier 36. The carrier 36 may be a polymeric member that assists in transferring force from the first end 62 of the wrap spring 25 into one of two lugs 71 on the driver 38. For example, the carrier 36 may have lug receiving apertures (a small portion of each of which can be seen in at 72 in FIG. 7) that snugly receive the lugs 71. The carrier 36 may have the slot 70 positioned so that when the lugs 71 are received in the lug receiving apertures 72, the carrier 36 snugly holds the tip of the first end 62 in direct engagement with one of the lugs 71. In the illustrated embodiment the carrier 36 itself does not directly transfer torque but it will be understood that the carrier 36 can have features which engage the lugs 71 to assist in torque transfer.

A carrier retainer 73, such as a metallic member, can be press-fit on the driver 38 (which may be metallic) to retain the carrier 36 in position to assist in the transfer of torque between the first end 62 of the wrap spring 25 and the driver 38.

The driver 38 itself may be made from two elements, including a first driver portion 38a and a second driver portion 38b, which may be press-fit into the first driver portion 38a so as to be fixedly connected thereto.

The driver 38 transfers torque from the first end 62 of the wrap spring 25 to the rotor 28. As shown in the partial exploded view in FIG. 8, the second driver portion 38b may have a linear slot 74, similar to slot 56 in the second transfer member 46, which engages a linear projection 76 on the rotor 28.

The wrap spring clutch 24 can be set in an engaged or driving position (FIG. 4A) in which the wrap spring clutch 24 operatively connects the camshaft 14 to the rotor 28 or set in a disengaged or non-driving position (FIG. 4B) in which the wrap spring clutch 24 operatively disconnects the camshaft 14 from the rotor 28. In the engaged position the wrap spring 25 is essentially locked against, and rotates together with, the clutch engagement surface 60 of the second transfer member 46. As the second transfer member 46 is drivingly connected to the camshaft 14, the first end 62 of the wrap spring clutch 24 may be said to be driven by the camshaft 14 when the wrap spring clutch 24 is in the engaged position. In the disengaged position, as discussed in greater detail below, the wrap spring 25 disengages from the clutch engagement surface 60 of the second transfer member 46 whereby the wrap spring 25 does not rotate in conjunction with the second transfer member 46.

Figure 4A:
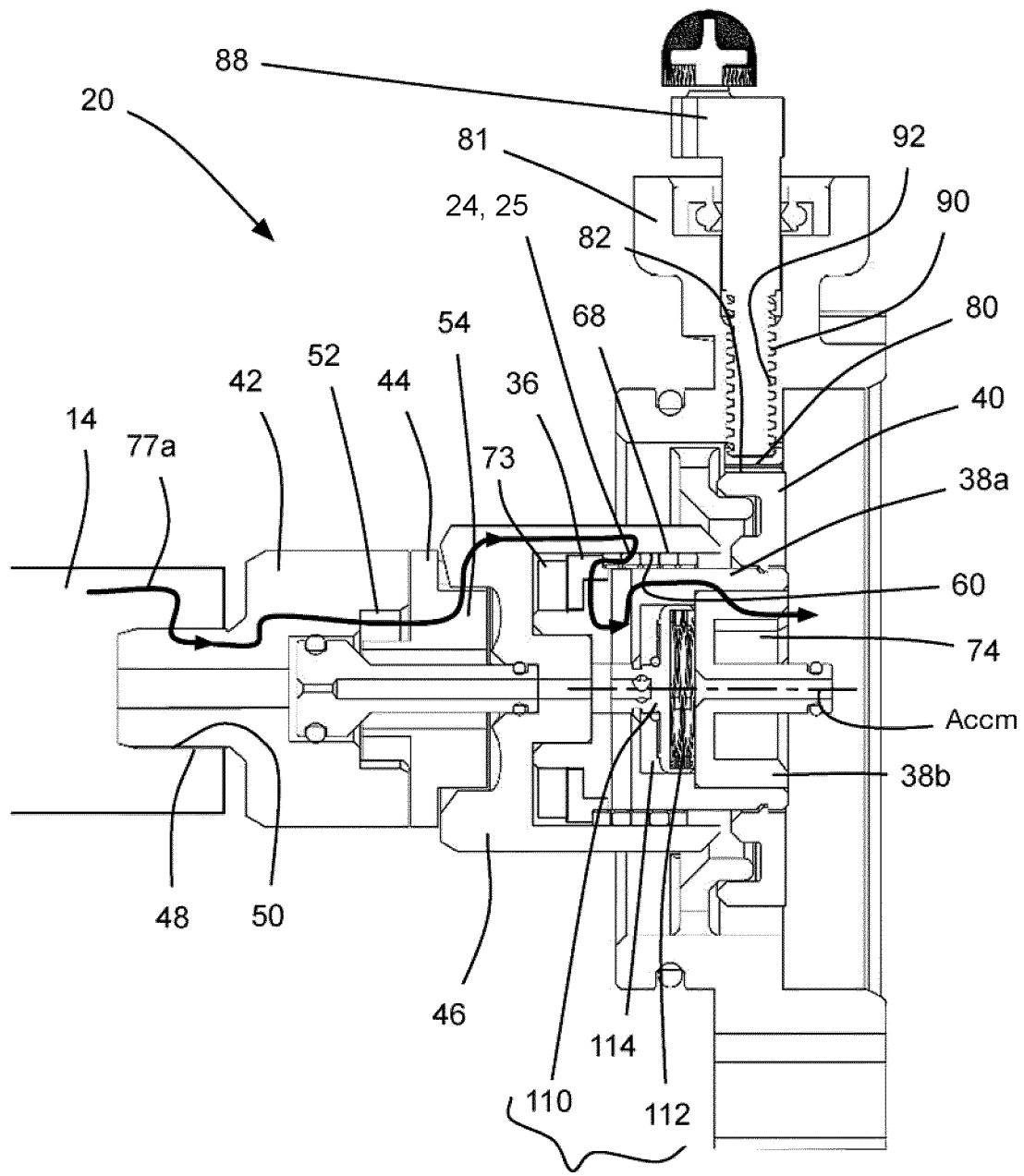
FIG. 4A is a sectional elevation view of the assembly shown in FIG. 2 in a first position.
Figure 4B:
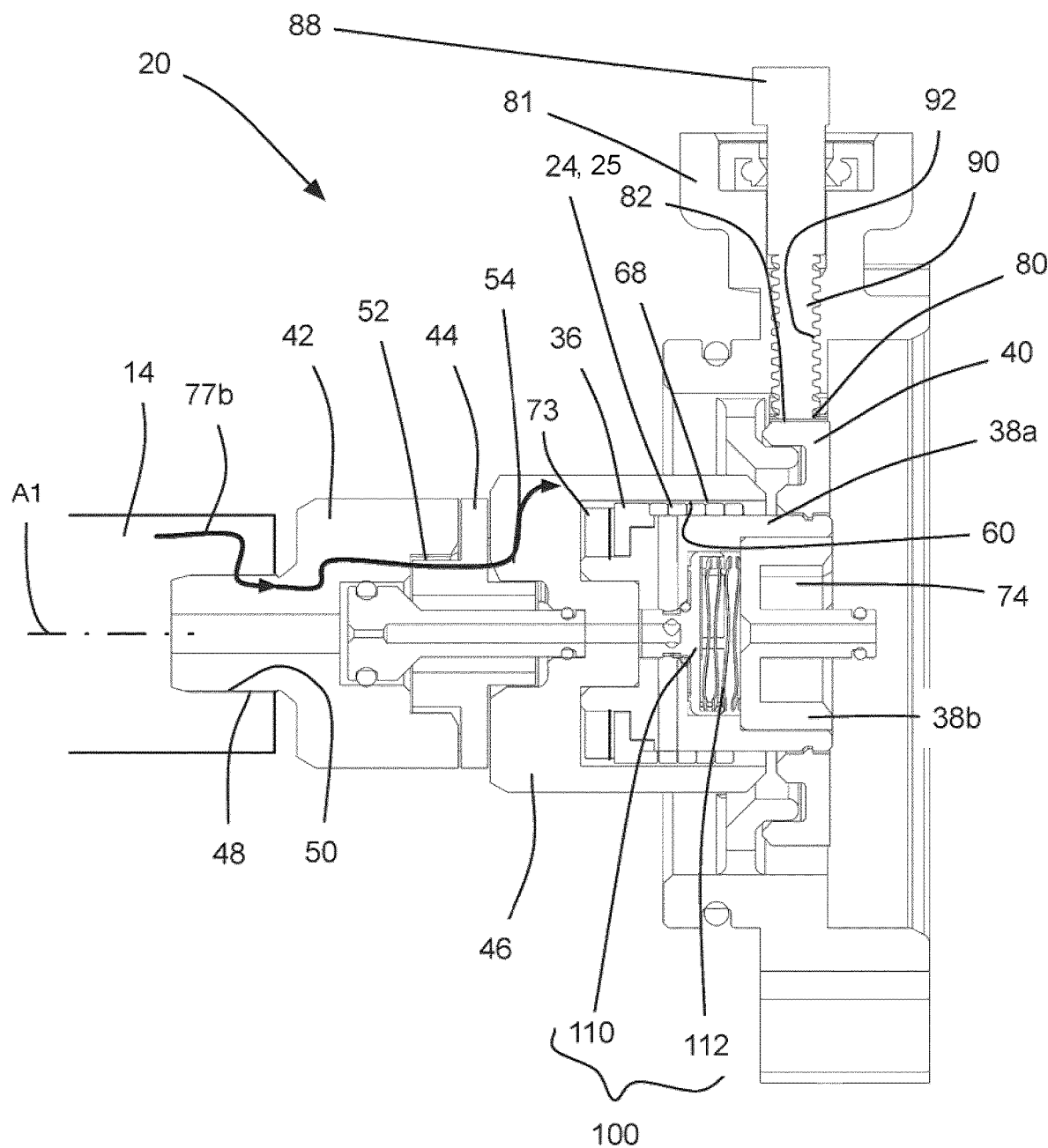
FIG. 4B is a sectional elevation view of the assembly shown in FIG. 2 in a second position.

FIGS. 4A and 4B show torque flow paths at 77A and 77B, respectively, to illustrate the elements that are driven by the camshaft 14 when the wrap spring clutch 24 is in the engaged position (FIG. 4A) and the disengaged position (FIG. 4B). As can be seen, in the engaged position torque is transferred from the camshaft 14 through the connector 32, into the wrap spring 25, into the driver 38 and therefore to the rotor 28 (not shown in FIG. 4A). In the disengaged position, torque is transferred from the camshaft 14 and into the connector 32, ending at the second transfer member 46.

The wrap spring clutch 24 may be biased towards one of the engaged and disengaged positions. In the example shown, the wrap spring clutch 24 is biased to the engaged position by virtue of the wrap spring 25 having a nominal resting diameter larger than the inner diameter of the clutch engagement surface 60 of the second transfer member 46. Thus, the wrap spring clutch 24 defaults to the engaged position.

As seen in FIG. 7, the clutch control member 40 holds the second end 64 of the wrap spring clutch 24. The clutch control member 40 may be a disc that has a slot 78 that holds the second end 64 of the wrap spring 25. The second end 64 may be bent into an axially extending tang.

Figure 5:
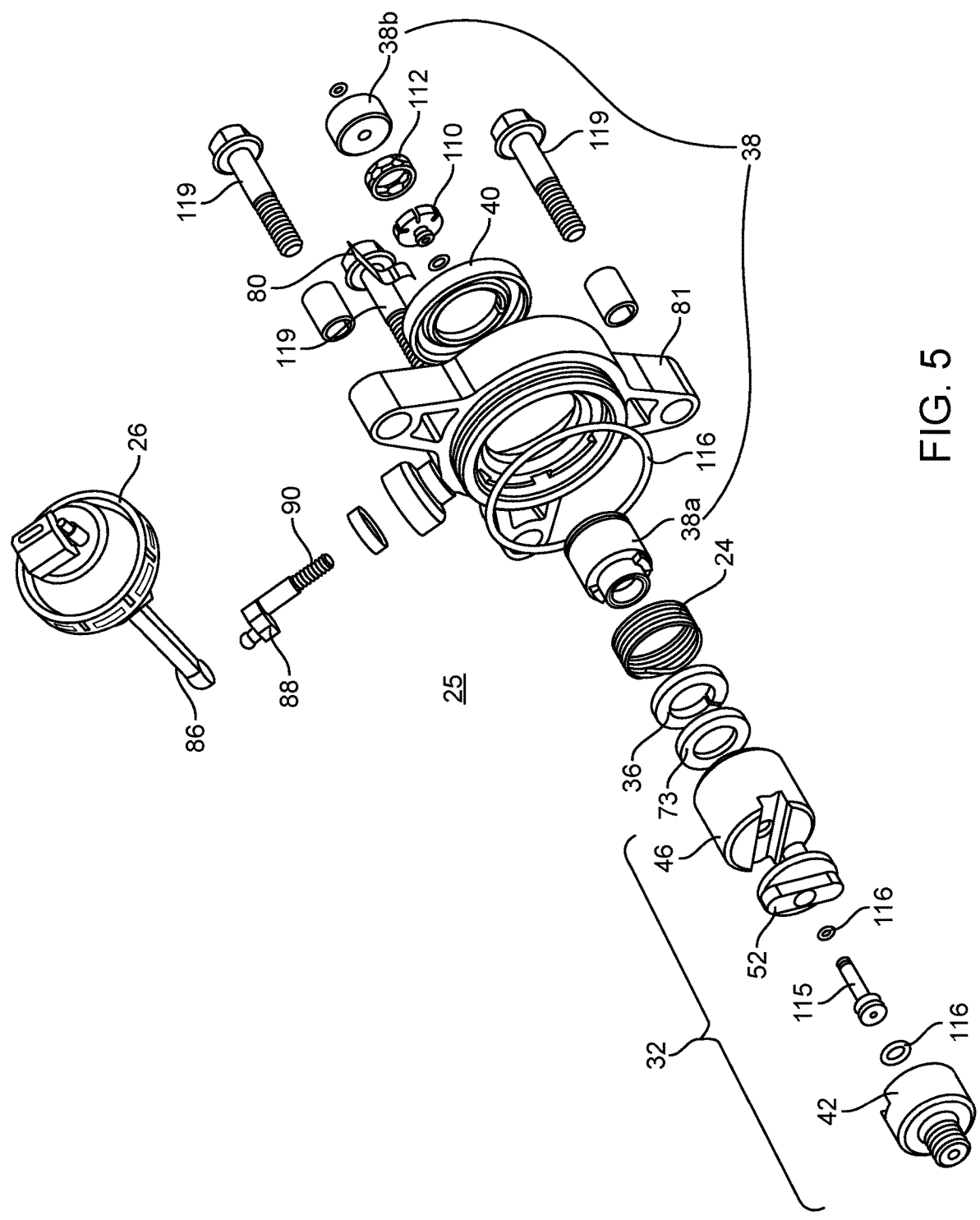
FIG. 5 is a perspective exploded view of the assembly shown in FIG. 2.
Figure 6:
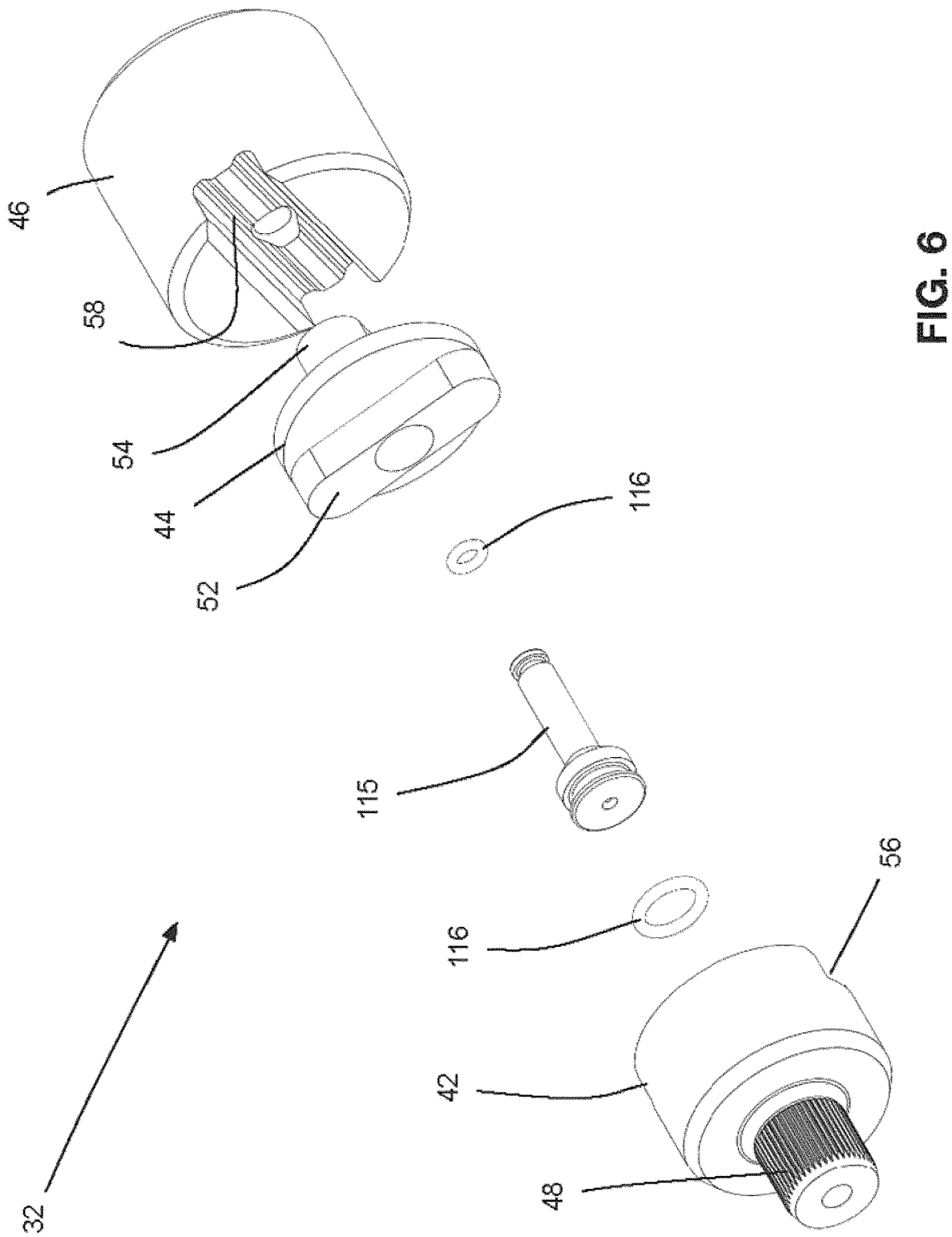
FIG. 6 is a magnified perspective exploded view of a portion of the assembly shown in FIG. 5.

As seen in FIGS. 4A, 4B and 5, a brake 80 interacts with the clutch control member 40. The brake 80 can be set to a non-braking position (FIG. 4A) and a braking position (FIG. 4B). The brake 80 may be a small metallic strip that extends from a stationary member 81 (e.g. a first housing portion of the assembly 20) and which engages a radially outer surface 82 (that may be referred to as a brake engagement surface 82) of the clutch control member 40. When set to the braking position, the brake 80 contacts and begins to slow the clutch control member 40 relative to the camshaft 14 so as to retard the angular position of the second end 64 of the wrap spring 25 relative to the first end 62 thereof, causing the wrap spring 25 to coil more tightly and disengage from the clutch engagement surface 60 of the second transfer member 46, placing the wrap spring clutch 24 in the disengaged position. The wrap spring 25 will remain disengaged so long as the brake 80 is applied. In the non-braking position, the brake 80 does not interfere with the relative angular positions of the first and second ends 62, 64 of the wrap spring 35, enabling the wrap spring 25 to remain in the engaged position.

The brake 80 may act as a leaf spring and may be biased by its own resiliency to the non-braking position.

The vacuum actuator 26 is operatively connected to the brake 80 such that movement of the vacuum actuator 26 to the low-pressure position places the brake 80 in the braking position and the wrap spring clutch 24 in the disengaged position. Movement of the vacuum actuator 26 to the high-pressure position places the brake 80 in the non-braking position and the wrap spring clutch 24 in the engaged position.

As seen in FIGS. 2-4, in the present example the vacuum actuator 26 includes a vacuum actuator housing 83, a diaphragm 84, a vacuum actuator biasing member 85 and an actuator rod 86 that operatively connects the vacuum actuator to a crank 88. The crank 88 is connected to a leadscrew 90 that engages a thread 92 in a stationary member such as the first system housing portion 81. The leadscrew 90 engages the brake 80. When the vacuum actuator 26 is in the high-pressure position (FIG. 3), the leadscrew 90 is retracted, enabling the brake 80 to be in the non-braking position. As a result, the clutch control member 40 rotates with the wrap spring 25, which rotates with the camshaft 14. When the vacuum actuator 26 moves to the low-pressure position (FIG. 3A), the leadscrew actuator 86 moves the crank 88 in a first direction through a selected arc, which advances the leadscrew 90 to engage and drive the brake 80 into engagement with the clutch control member 40 such that the brake 80 retards rotation of the clutch control member 40 relative to the camshaft 14. Because the clutch control member 40 holds the second end 64 of the wrap spring 25, retarding the clutch control member 40 causes the wrap spring 25 to contract radially, bringing the wrap spring clutch 24 out of engagement with the second transfer member 46 and operatively disconnecting the camshaft 14 and the rotor 28.

Movement of the vacuum actuator 26 back to the high-pressure position causes the actuator rod 86 to drive the crank 88 back in a second direction through the selected arc, which retracts the leadscrew 90, which in turn permits the brake 80 to lift away from the clutch control member 40. As a result, the wrap spring 25 expands under its own restoring force and engages the second transfer member 46.

Thus, it will be understood from the foregoing that when the pressure in the vacuum conduit 30 is sufficiently low, the vacuum actuator 26 moves to the low-pressure position (FIG. 3A), disconnecting the vacuum pump 22. The vacuum conduit 30 may be connected to one or more sources of vacuum in a vehicle, such as to a brake booster, a turbocharger wastegate, or the intake manifold of the engine, and when the pressure in the vacuum conduit 30 becomes too high, the vacuum actuator 26 moves to the high-pressure position (FIG. 3), thereby activating the vacuum pump 22 so as to generate vacuum. In some embodiments, the vacuum pump 22 is connected to the vacuum conduit 30 and therefore generates vacuum in that conduit 30. As a result, the vacuum pump 22 itself will generate vacuum until there is sufficient vacuum in the conduit 30 that the vacuum actuator moves back to the position shown in FIG. 3A, which will cause stoppage of the pump 22. Thus, the assembly 20 automatically activates and deactivates the vacuum pump 22 based on the level of vacuum in the vacuum conduit 30, precluding the need for electronic controls.

In the embodiments described herein, it will be noted that, in the event of a failure of the vacuum actuator 26 or any components that act between the vacuum actuator 26 and the clutch control member, the vacuum pump 22 will be driven by the camshaft 14, so as to ensure that there is always sufficient vacuum even in the event of a failure.

Figure 24:
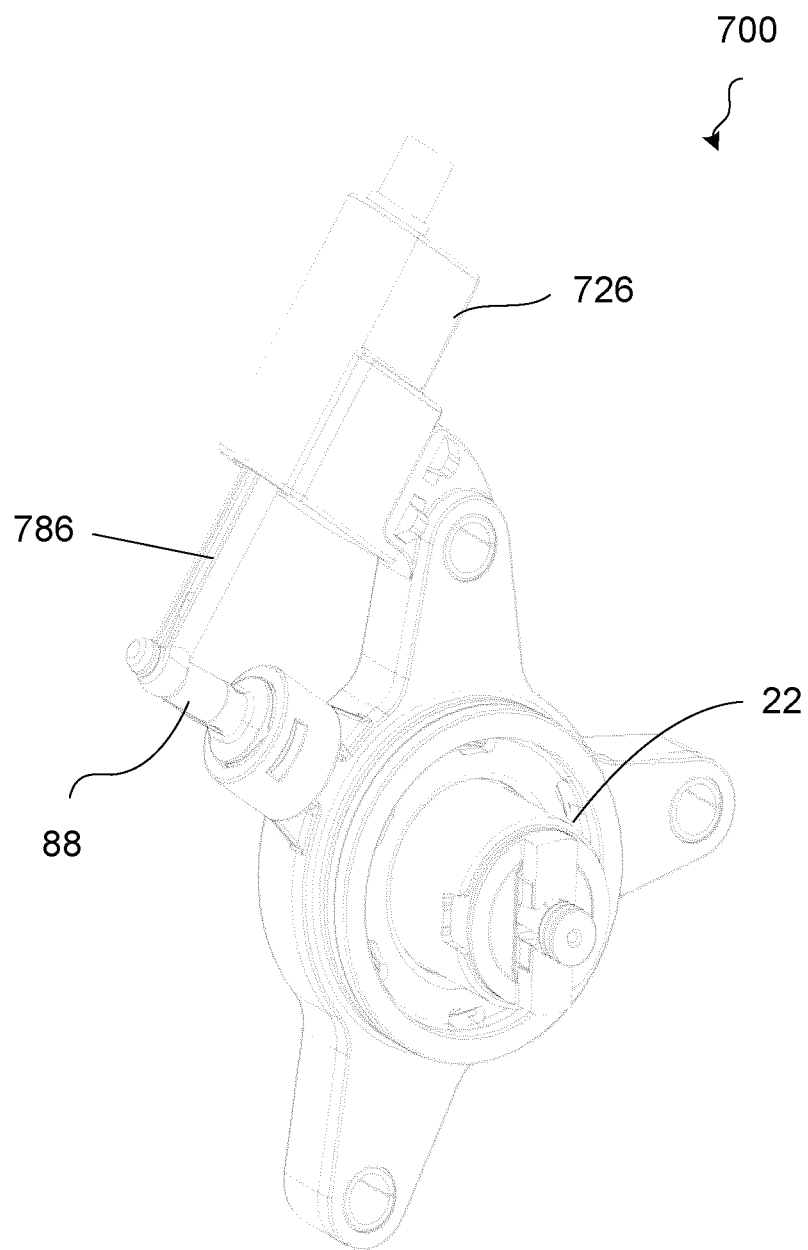
FIG. 24 is a front perspective view of an alternative embodiment of the assembly shown in FIG. 2, in which a solenoid replaces the vacuum actuator.

FIG. 24 shows an alternative embodiment 700 of the assembly 20 where the vacuum actuator 26 is replaced by a solenoid 726 that drives actuator rod 786. The actuator rod 786 drives the crank 88, which in turn drives the leadscrew 90 and the brake 80, as discussed above. For control purposes a vacuum pressure measuring transducer could be connected to an electronic controller in order to switch the vacuum pump 22 on or off.

Hysteresis

Figure 11:
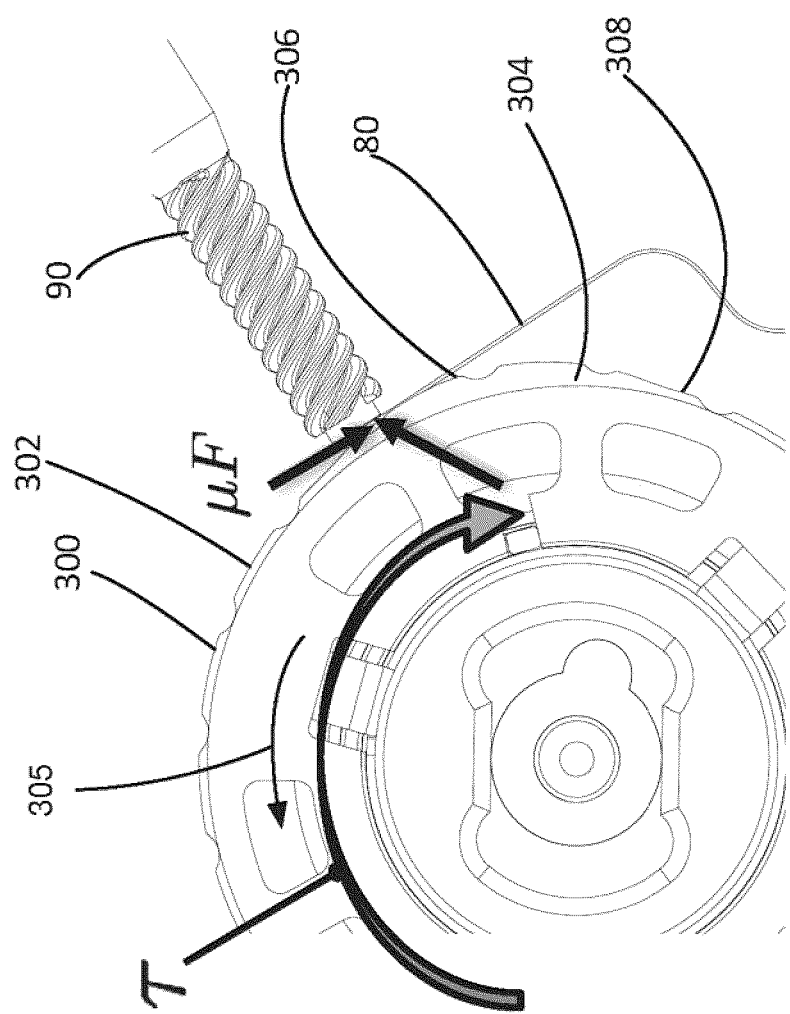
FIG. 11 is a sectional end elevation view of another alternative embodiment of the assembly.

FIG. 11 shows an optional, alternative clutch control member 300. The clutch control member 300 is similar to the clutch control member 40 but has a radially outer surface 302 which has a lobe 304 on it. As the clutch control member 300 rotates in a certain direction (shown at 305 in FIG. 11) the lobe 304 has a leading surface 306 that has a progressively increasing distance from the axis of rotation of the clutch control member 300 and a trailing surface 308. The actual size of the lobe (radially) may be as little as 0.5 mm in some embodiments, or it may be larger. It is shown exaggerated in the figures. The angular width of the size of the lobe 304 may be any suitable width, such as about 90 degrees. By providing the lobe 304, the leadscrew 90 can engage and stop the clutch control member 300 in a generally consistent selected angular position each time the leadscrew 90 is employed to stop the clutch control member 300. This can be advantageous for several reasons. One advantage is that the clutch control member 300 may be connected to the vacuum pump rotor 28 such that, when the clutch control member 300 is stopped in the selected angular position, the vacuum pump rotor 28 is stopped in the generally consistent selected angular rotor position from which there is relatively low resistance to rotor movement during actuation of the vacuum pump 22. In other words, the position at which the rotor 28 may be stopped each time may be selected so that it is relatively easy to start up the vacuum pump 22 again when needed. A 'generally consistent selected angular position' may be any position within a selected range of positions, such as any position within plus or minus about 15 degrees of the position shown in FIG. 11. Alternatively, the selected range of positions may be any position within plus or minus about 30 degrees.

The clutch control member 300 may have any suitable non-round shape so as to have any suitable selected number of lobes 304. A generally square shape has four lobes, for example.

As the leadscrew 90 brings the brake 80 into engagement with the outer surface 302 of the clutch control member 300, a wedging effect occurs as the leading surface 306 of the lobe 304 engages the brake 80, which causes a greater amount of braking force to be applied to the clutch control member 300 than would be applied if the outer surface 302 were perfectly circular.

As a result of the wedging effect by the non-round clutch control member 300, the vacuum actuator 26 moves into position to stop the clutch control member 300 relatively easily. Additionally, the additional braking force that is provided relative to a version with a circular clutch control member means that the clutch control member 300 remains stopped for longer (i.e. thereby delaying the rotation of the clutch control member 300 and the consequent driving of the vacuum pump rotor 28, as compared to the clutch control member 40, as compared to a perfectly circular clutch control member). Consequently, the non-round outer surface of the clutch control member 300 provides setpoint hysteresis to the assembly 20 in that a first degree of vacuum is needed in the vacuum conduit 30 to initiate actuation of the vacuum actuator 26 to stop the clutch control member 300, and a second degree of vacuum that is less strong (i.e. is closer to atmospheric pressure) than the first degree of vacuum is needed to return the vacuum actuator 26 to the position in which the clutch control member 300 is permitted to rotate.

Setpoint hysteresis can be important for the passively controlled assembly 20 because the vacuum actuator 26 may not be sufficiently precise to operate under a single control setpoint to prevent dithering under conditions close to the setpoint, resulting in assembly instability due to repeated turn-on/turn-off under such conditions.

Figure 17B:
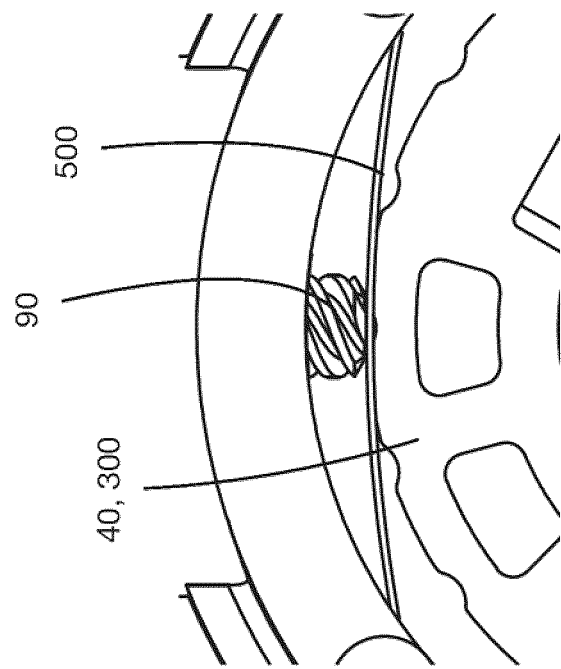
FIG. 17B is a sectional end view of the alternative braking structure shown in FIG. 17A showing the hysteretic spring band in a braking position.
Figure 17A:
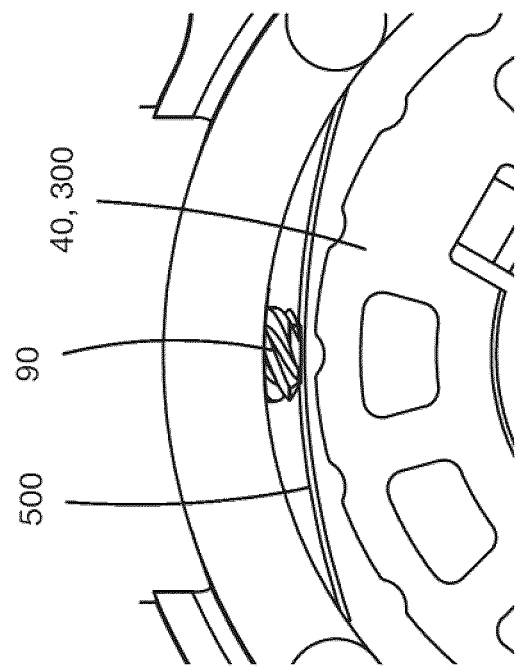
FIG. 17A is a sectional end view of an alternative braking structure that employs a hysteretic spring band, in a non-braking position.

FIGS. 17A and 17B show another means for providing setpoint hysteresis. As can be seen, the brake 80 in this embodiment is a hysteretic brake beam 500, such as a bistable spring band. When in the non-braking position (FIG. 17A), the brake beam 500 is stable. In order to move it to the braking position, the leadscrew 90 has to apply a relatively large amount of force, which causes the brake beam 500 to pass its transition position at which point it quickly moves to its second stable position, (i.e. the braking position shown in FIG. 17B) in which it engages and stops the clutch control member 40 (or 300). Until the brake beam 500 reaches and pass its transition position however, it exerts a relatively high resistance to movement by the leadscrew 90. As is the case with certain bistable devices (an example of which is a snap bracelet), the brake beam 500 may relatively easily return to the non-braking position shown in FIG. 17A. As a result, a first degree of vacuum is needed in the vacuum conduit to initiate actuation of the vacuum actuator 26 to stop the clutch control member 40, 300, and a second degree of vacuum that is less strong (i.e. is closer to atmospheric pressure) than the first degree of vacuum is needed to return the vacuum actuator 26 to the position in which the clutch control member 40, 300 is permitted to rotate.

Any other suitable structure may be provided for providing the aforementioned hysteresis effect that is provided by the embodiments shown in FIGS. 11 and 17A and 17B. The force needed to bring the bistable brake beam 500 from the first stable position to the second stable position may be referred to as the bifurcation force.

Figure 18:
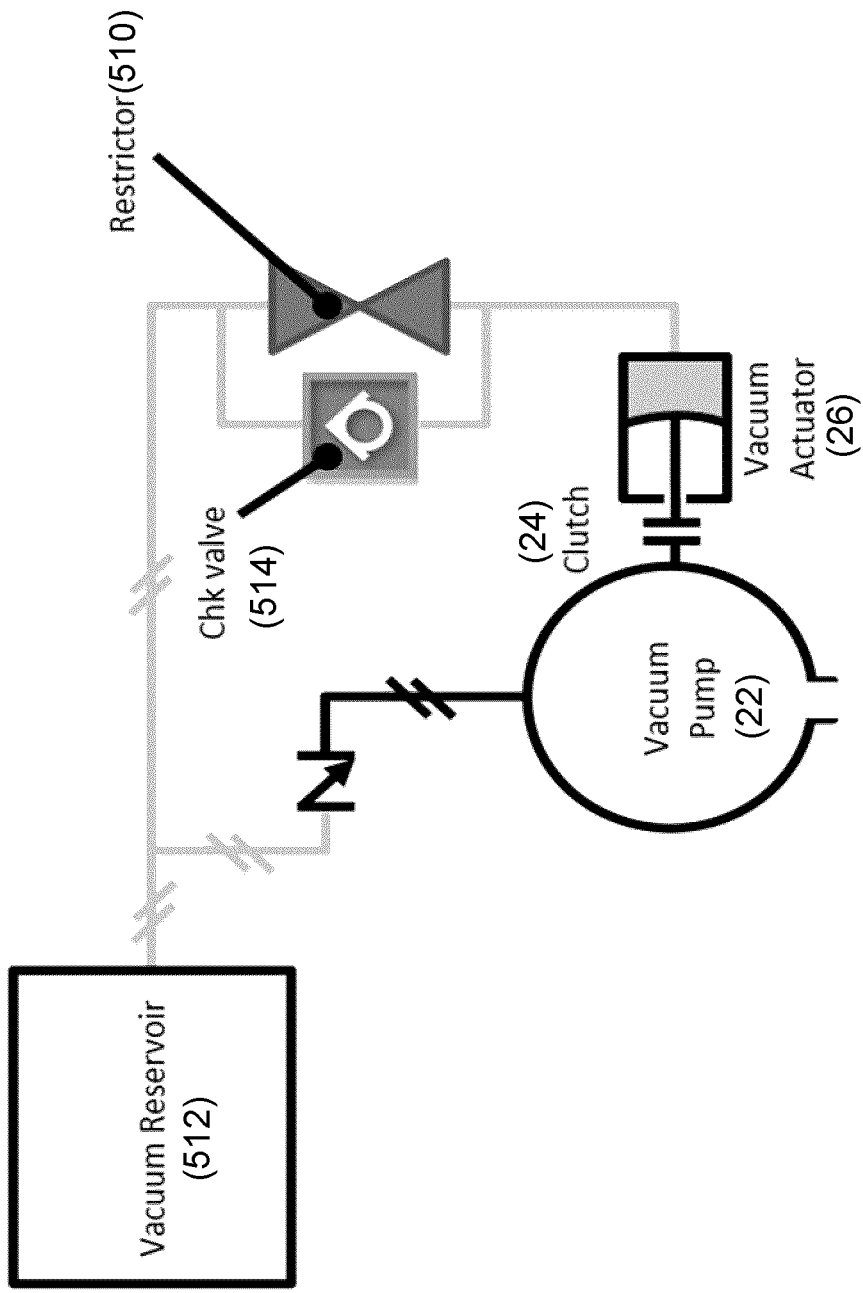
FIG. 18 is a schematic view of another alternative structure for generating a hysteresis effect during operation of the vacuum actuator, which includes a flow restriction element.
Figure 19:
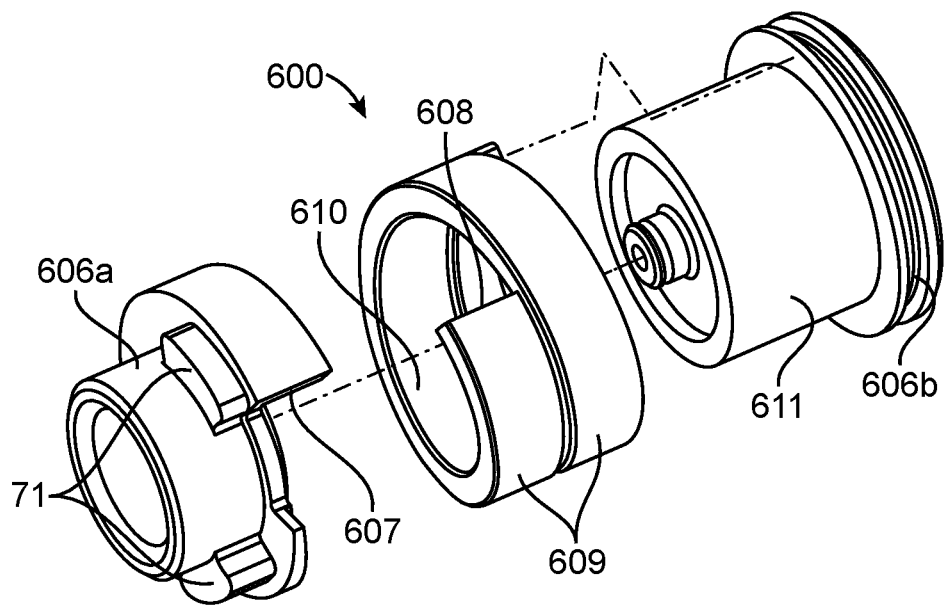
FIG. 19 is a perspective exploded view of an optional torque limiting clutch that can be used in the assembly shown in FIG. 2.
Figure 20:
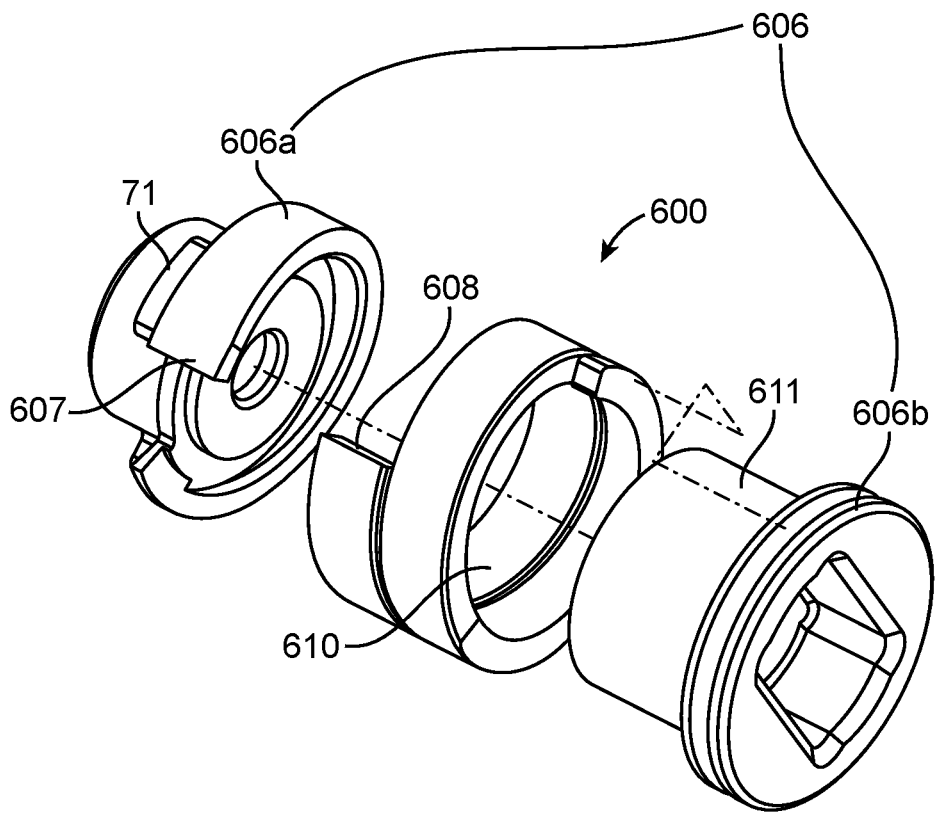
FIG. 20 is another exploded view of the optional torque limiting clutch shown in FIG. 19.

FIG. 18 shows another means for providing setpoint hysteresis. In this embodiment, a restrictor 510 is disposed between a vacuum reservoir 512 and the vacuum actuator 26. The restrictor 510 introduces a delay to the length of time the vacuum pump 22 is active so as to ensure that there is more vacuum generated than needed to turn the assembly 20 off—thus generating hysteresis. The amount of time delay or hysteresis is dependent on the characteristics of the vacuum pump 22 and the speed at which it is spinning. At higher speeds the restrictor 510 will generate higher hysteresis. A check valve 514 can also be installed in parallel to the restrictor 510. This ensures that the time delay does not occur when the pump 22 needs to turn on (air flows towards the actuator), as the check valve opening allows the restrictor 510 to be bypassed, allowing high flow to the actuator.

In embodiments where the assembly 20 utilizes an electrical actuator such as a solenoid to drive the leadscrew 90 and brake 80, setpoint hysteresis can be provided by the electronic control system which can establish turn-on and turn-off pressures.

Limiting Torque Transfer

Figure 21:
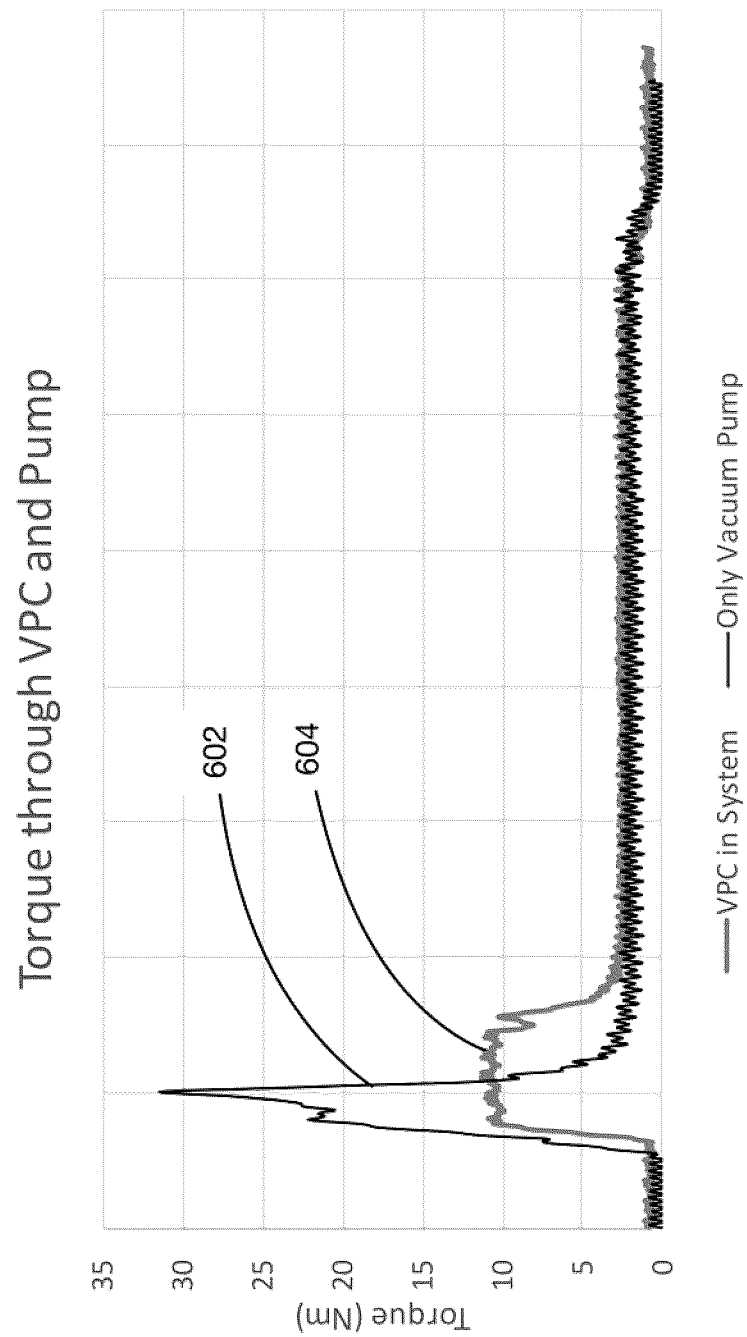
FIG. 21 is a graph illustrating a torque spike that occurs when a vacuum pump is started while full of oil with and without the torque limiting clutch shown in FIGS. 19 and 20.
Figure 22:
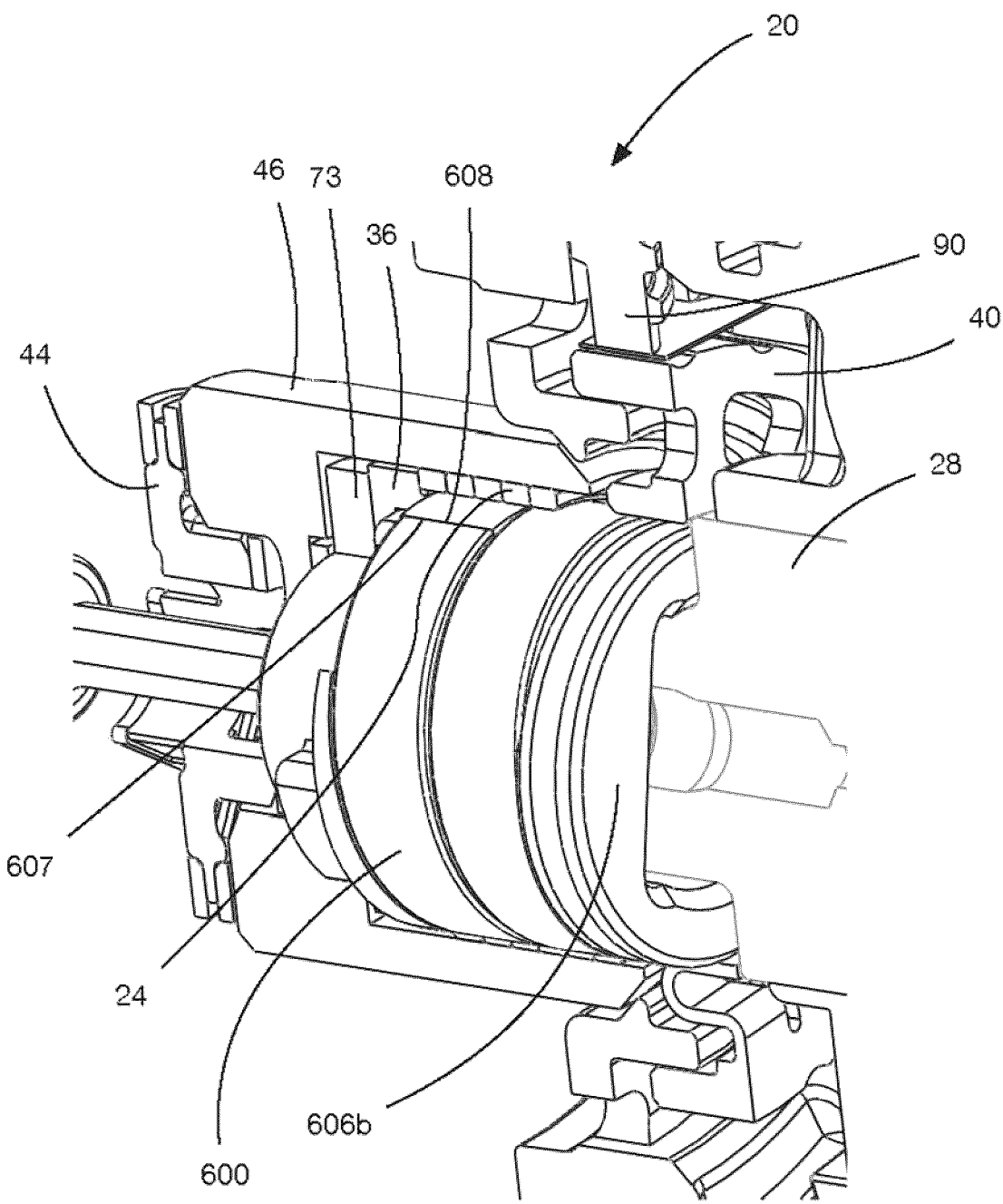
FIG. 22 is a sectional perspective view of the assembly shown in FIG. 2, with the torque limiting clutch shown in FIGS. 19 and 20.
Figure 23:
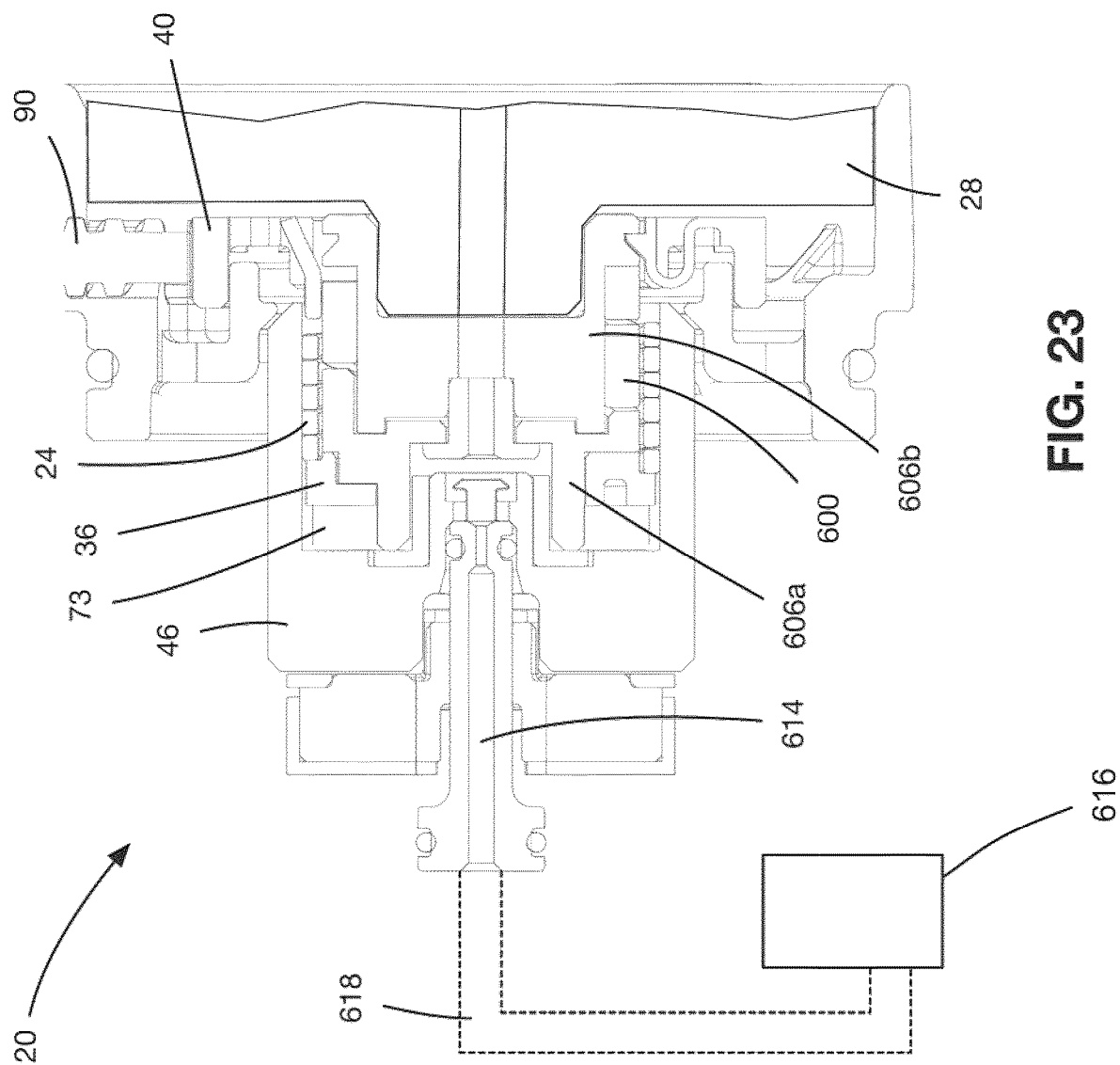
FIG. 23 is a sectional side elevation view of the assembly shown in FIG. 2, with the torque limiting clutch shown in FIGS. 19 and 20.

FIGS. 19-23 show an optionally provided torque limiting clutch 600 (FIG. 19) for use in the assembly 20 or similar assembly 20' shown in FIG. 23. The torque limiting clutch 600 may be used in conjunction with, or instead of, a means for preventing the vacuum pump 22 from filling with oil when it is not running, examples of which are disclosed below. The torque limiting clutch 600 is operatively connected between the camshaft 14 and the rotor 28 (FIG. 3) of the vacuum pump 22, to limit torque transfer to the rotor 28 when the clutch 24 is engaged. A typical vacuum pump could experience a torque spike upon start-up because of the amount of torque needed to drive the rotor to push the oil out of the pump. An example of such a torque spike is shown at 602 in FIG. 21, which shows a torque curve over time, for the vacuum pump 22 without any structure to prevent oil flow into the vacuum pump 22 when it is off, and without any structure to limit torque transfer to the vacuum pump 22. By contrast, providing the torque limiting clutch 600 on the vacuum pump 22 limits the amount of torque transferred to the vacuum pump 22. The torque spike shown at 604 in FIG. 21 is the torque spike that occurs when the torque limiting clutch 600 is provided, with no means to prevent oil flow into the vacuum pump 22 when it is not running. As can be seen, this torque spike 604 is much smaller than the torque spike 602. As a result of the lower torque being transferred to the vacuum pump 22, it will take slightly longer to drive the oil out from the vacuum pump 22 during pump startup through the torque limiting clutch 600 but this should not have a deleterious effect in practice.

In the embodiment shown in FIGS. 19-23, the driver, shown at 606, is part of the assembly 20 that transfers torque between the camshaft 14 (FIG. 1) and the rotor 28 (FIG. 3), and therefore the driver 606 may be said to transfer torque between the camshaft 14 and the rotor 28. In the embodiment shown in FIGS. 19-23, the driver 606 transfers torque from the clutch 24 to the rotor 28 through the torque limiting clutch 600. More specifically, the driver 606 is formed from two components, namely a first driver portion 600a and a second driver portion 606b. The first driver portion 606a may be similar to the first driver portion 38a shown in FIG. 4A, and may have lugs 71 that engage lug receiving recesses 72 in the carrier 36. The first driver portion 606a receives torque from the first end 62 of the wrap spring 25 via the carrier 36. The first driver portion 606a has a contact surface 607 thereon that extends generally radially and axially and that engages a first end 608 of the torque limiting clutch 600. The torque limiting clutch 600 may itself be a type of wrap spring, and has one or more coils 609 (also referred to as coil 609) that extend generally helically. The first end 608 of the torque limiting clutch 600 is a first helical end of the one or more coils 609.

The torque limiting clutch 600 has a radially inner or outer surface 610 that is frictionally engaged with a complementary radially inner or outer surface 611 of the second driver portion 606*b*, with a selected amount of preload (i.e. with a selected amount of normal force applied by the surface 610 on the surface 611). In the embodiment shown, the surface 610 is a radially inner surface 610 of the coil 609 and the complementary surface 611 is a radially outer surface of the second driver portion 606*b*. The amount of torque that can be transmitted through the torque limiting clutch 600 to the second drive portion 606*b* depends on several factors including the surface area of contact between the coil 609 and the second driver portion 606*b*, the coefficient of friction between the coil 609 and the second driver portion 606*b*, and the normal force with which the coil 609 is engaged with the second driver portion 606*b*.

As can be seen, the torque limiting clutch 600 is shown as a 'closing' type of wrap spring clutch. This means that the coil 609 transmits torque through its radially inner surface shown at 610, to the radially outer surface 611 of the second driver portion 606*b*. However, when torque is transmitted to the torque limiting clutch 600 from the first driver portion 606*a*, the torque urges the one or more coils 609 to open radially, which causes a reduction of the normal force on the second driver portion 606*b*. In other words, increasing torque transfer to the first helical end 608 of the torque limiting clutch 600 drives movement of the first helical end 608 (due to flexure of the coil 609) in a direction that reduces the preload until the surface 610 slips on the complementary surface 611. This, in turn, causes the maximum amount of torque that can transmitted through the connection between the torque limiting clutch 600 and the second driver portion 606*b*, to decrease. As the amount of torque transmitted to the torque limiting clutch 600 increases, the magnitude of the normal force applied by the torque limiting clutch 600 on the second driver portion 606*b* decreases, and so the amount of torque that the torque limiting clutch 600 can transmit to the second driver portion 606*b* decreases. There is a point at which the torque transmitted to the torque limiting clutch 600 by the first driver portion 606*a* equals the amount of torque that it can transmit to the second driver portion 606*b*, and at that point, slippage occurs between the torque limiting clutch 600 and the second driver portion 606*b*. Once there is slippage, the frictional resistance force between the torque limiting clutch 600 and the second driver portion 606*b* levels off based on the kinetic coefficient of friction between them. This resistance force effectively limits the amount by which the coil 609 will open when torque is inputted to it from the first driver portion 606*a*. Up until there is slippage, an increase in the amount of torque that is inputted to the torque limiting clutch 600 from the first driver portion 606*a* is met with an increase in the amount of frictional resistance in reaction to the increased torque. Once there is slippage however, if an attempt is made to increase the torque inputted to the torque limiting clutch 600, it is met with increased slippage, as opposed to an increased resistance force, and so there is no corresponding increase in the amount by which the torque limiting clutch 600 opens. Thus, once this slippage occurs the amount of torque that can be transmitted remains level, dependent on the kinetic coefficient of friction, the contact area and the normal force. As a result, the amount of torque that can be transmitted through the interface between the coil 609 and the second driver portion 606*b* is limited to a selected value. The value is selected to be low enough to prevent damage to the components transmitting the torque between the camshaft 14 and the vacuum pump rotor 28. The value may be selected to be low enough to provide at least a selected fatigue life to these components. The value may be set to be high enough to ensure that the vacuum pump 22 empties itself of oil within a selected amount of time so that it can act to generate vacuum as needed. The particular value or range of values that are acceptable will vary depending on the specific application.

Referring to FIGS. 22 and 23, the driver 606 may be operatively connected to the rotor 28 in the same way that the driver 38 (FIG. 8) engages the rotor 28, (e.g., by means of a linear slot 74 on the second driver portion 606*b*, which engages the linear projection 76 on the rotor 28.

As can be seen in FIG. 23 in particular, an oil flow path 614 extends through the assembly 20 from a source of oil 616 to the rotor 28 (FIG. 22). The oil flow path 614 differs from an oil flow path 102 shown in FIG. 9A that will be discussed in greater detail below in that the oil flow path 614 does not include a structure, such as a valve, to stop oil flow to the rotor 28, and is instead an open path from the source of oil 616 to the rotor 28. A portion of the oil flow path 614 is shown schematically by dashed lines in FIG. 23.

It should be appreciated that the torque limiting clutch 600 can be applied to an assembly 20 that employs any kind of clutch 24, i.e., clutch 24 does not have to be a wrap spring clutch. For example, assembly 24 can be an electromagnetic clutch such as disclosed in FIGS. 1-5 of WO2014/165977, the contents of which are incorporated herein by reference.

Oil Flow Control

Figure 9A:
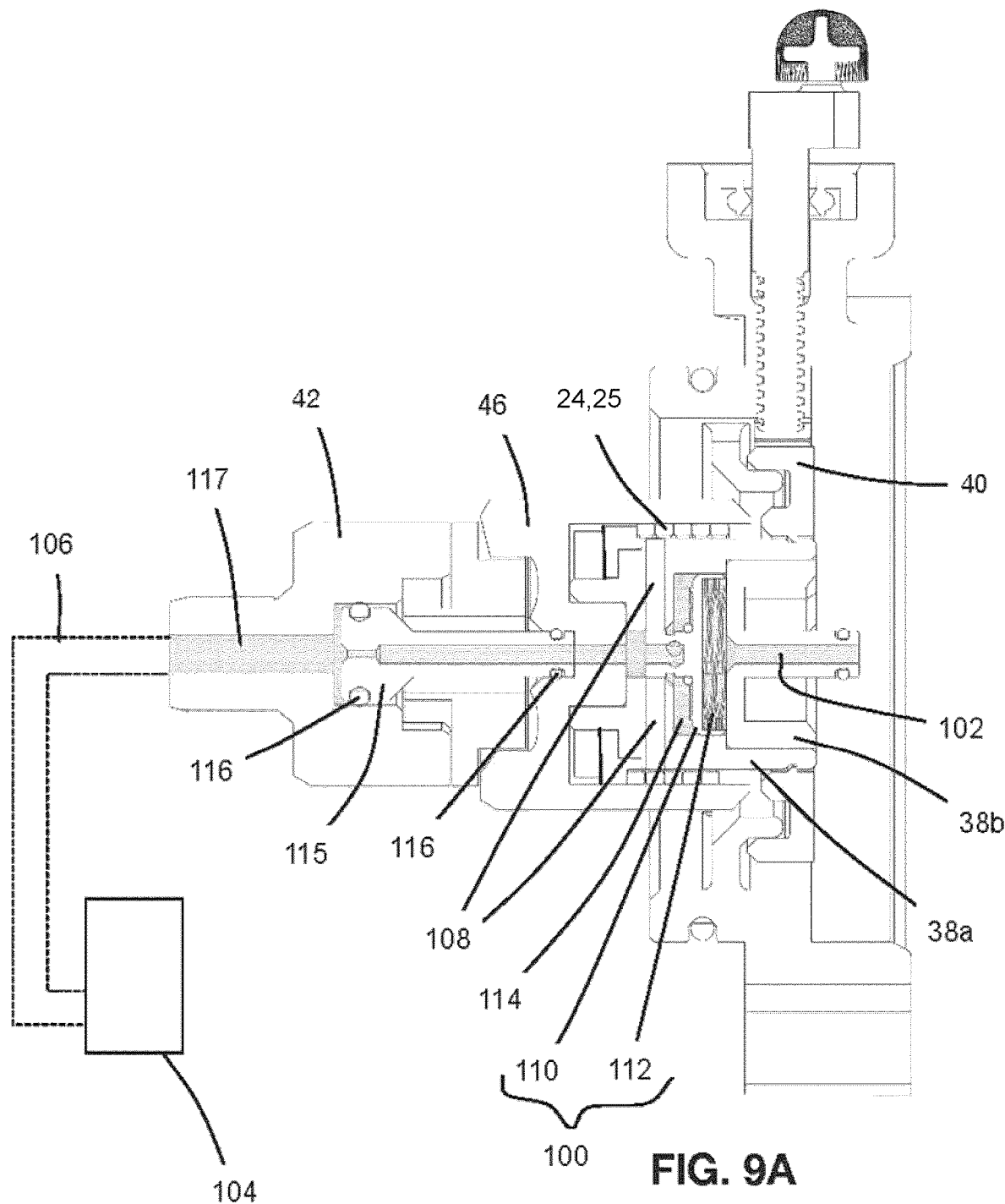
FIG. 9A is a sectional side elevation view of the assembly in the position shown in FIG. 4A, illustrating an oil flow path through the assembly when in this position.

In some embodiments, the vacuum pump 22 may require a flow of oil therein to lubricate the rotor 28 during rotation, as is the case with some rotary vane vacuum pumps, for example. Additionally, oil may be needed in the vacuum pump 22 to help form a seal between vanes and the housing of the pump 22, in order for the pump 22 to generate a stronger vacuum. However, it is beneficial to stop the flow of oil into the vacuum pump 22 when the vacuum pump 22 is not running. In some embodiments, an oil flow control arrangement is provided, which includes a valve 100 (shown in FIGS. 9A and 9B) that stops the flow of oil to the vacuum pump 22 when it is not running (FIG. 9B) and permits the flow of oil to the vacuum pump 22 when it is running (FIG. 9A). Additionally, the valve 100 may permit flow to the wrap spring clutch 24 when the vacuum pump 22 is not running. As a further option, the valve 100 may operate without the need for electronic controls.

Figure 9B:
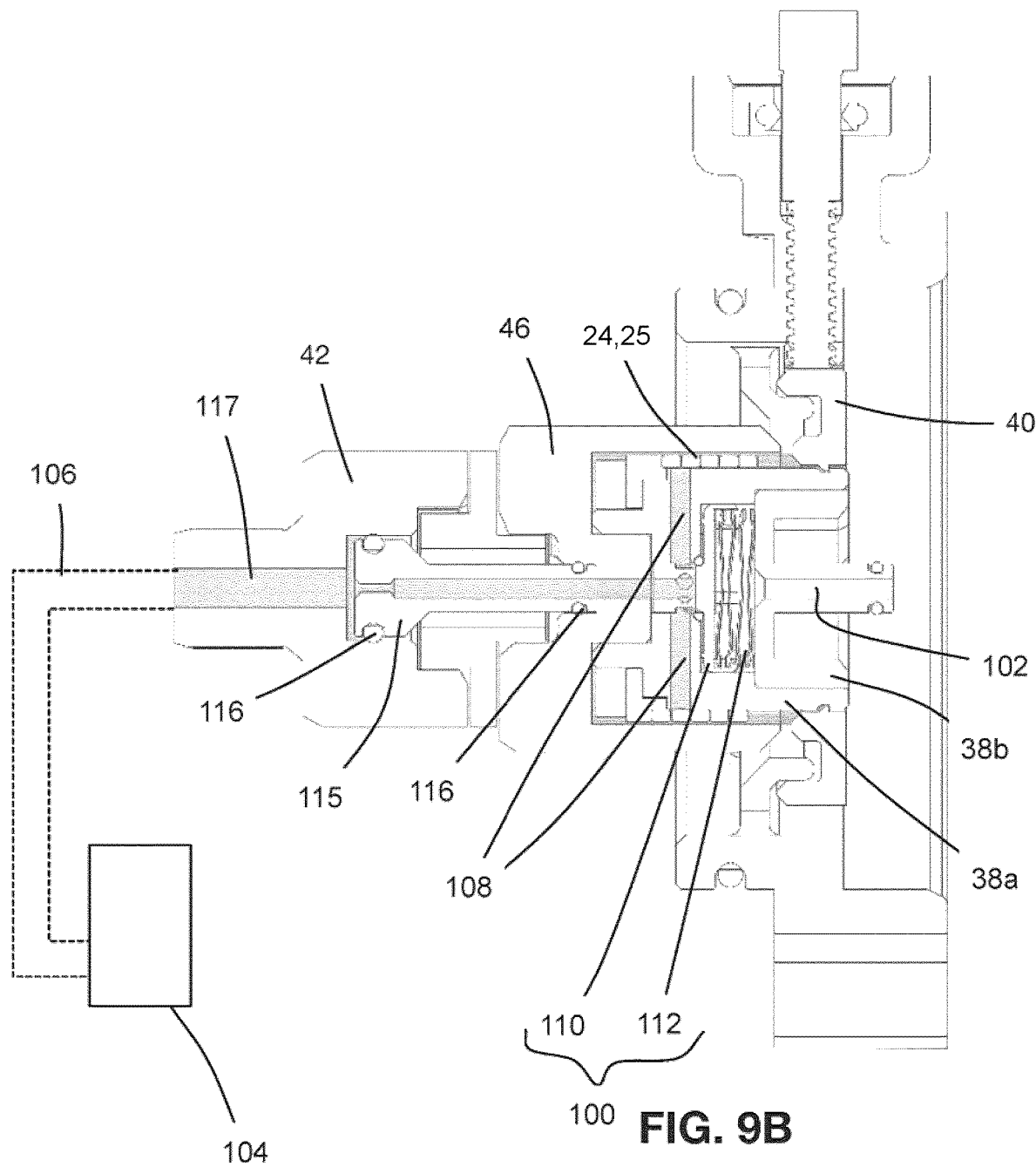
FIG. 9B is a sectional side elevation view of the assembly in the position shown in FIG. 4B, illustrating an oil flow path through the assembly when in this position.

In FIG. 9A the wrap spring clutch 24 is positioned in the engaged position so as to operatively connect the camshaft 14 to the rotor 28 to drive the rotor 28. In FIG. 9B, the wrap spring clutch 24 is in the disengaged position wherein the wrap spring clutch 24 operatively disconnects the camshaft 14 from the rotor 28 such that the rotor 28 stops.

A first oil flow path shown at 102 extends from an oil source 104 (e.g. the vehicle's oil reservoir which is not shown) to the vacuum pump 22. The oil source 104 is shown schematically as a simple rectangle and the conduit leading from it to the assembly 20 is shown in dashed lines at 106. A second oil flow path 108 extends from the oil source 104 to the wrap spring clutch 24.

The valve 100 includes a valve member 110 that is positionable in a first position (FIG. 9A) in which the valve member 110 permits oil flow in the first oil flow path 102, and a second position in which the valve member 110 permits oil flow in the second oil flow path 108. The valve member 110 is moved to the first position by driving of the rotor 28 and is moved to the second position by stoppage of the rotor 28. In the example shown, this is achieved by providing a biasing member 112 that applies a biasing force to urge the valve member 110 to the second position, and positioning the valve member 110 in such a way that a vacuum generated by operation of the rotor 28 is sufficient to draw the valve member 110 to the first valve member position against the biasing force applied by the valve member biasing member 112. In the embodiment shown, the valve member biasing member 112 is a wave washer or other similar member. The valve member biasing member 112 may be positioned, along with the valve member 110 in a chamber 114 defined between the first and second driver portions 38a and 38b.

By directing the oil flow to the wrap spring clutch 24 when the vacuum pump 22 is not being driven, the oil can assist in reducing the amount of residual friction that may exist by some small rubbing between the wrap spring 25 and the clutch engagement surface 60 when the wrap spring clutch 24 is in the disengaged position. This reduces the amount of power consumed by the engine 10 when the vacuum pump 22 not being driven.

The valve member 110 is configured to direct oil flow as described above through suitable aperture and sealing arrangements. When the valve member 110 is in its first position (FIG. 9A), the valve member is open to the first oil flow path 102 and seals the second oil flow path 108. Conversely, when the valve member 110 is in its second position, the valve member is open to the second oil flow path 108 and seals off the first oil flow path 102. In some embodiments, it is possible for the valve member 110 to be configured to permit oil flow to the wrap spring clutch 24 when the valve member 110 is in either of its first and second positions, but to permit oil flow to the vacuum pump 22 only when the valve member 110 is in its first position.

While FIGS. 9A and 9B relate to a vacuum pump 22 that is driven by the camshaft 14, it will be understood that the vacuum pump 22 could instead be any accessory that operates using oil, and that the camshaft 14, which is driven by the engine 10, could alternatively be any other suitable input member that is driven by any other suitable power source.

As can be seen in FIGS. 9A and 9B, portions of the overall oil circuit (which includes, for example, the oil flow paths 106, 102 and 108) may be provided directly in certain components such as is shown at 117 in the camshaft adapter 42, however some portions may be provided by a separate conduit as shown at 115. Suitable seal members 116 (e.g. O-rings) are used where needed to maintain an oil seal.

Figure 8:
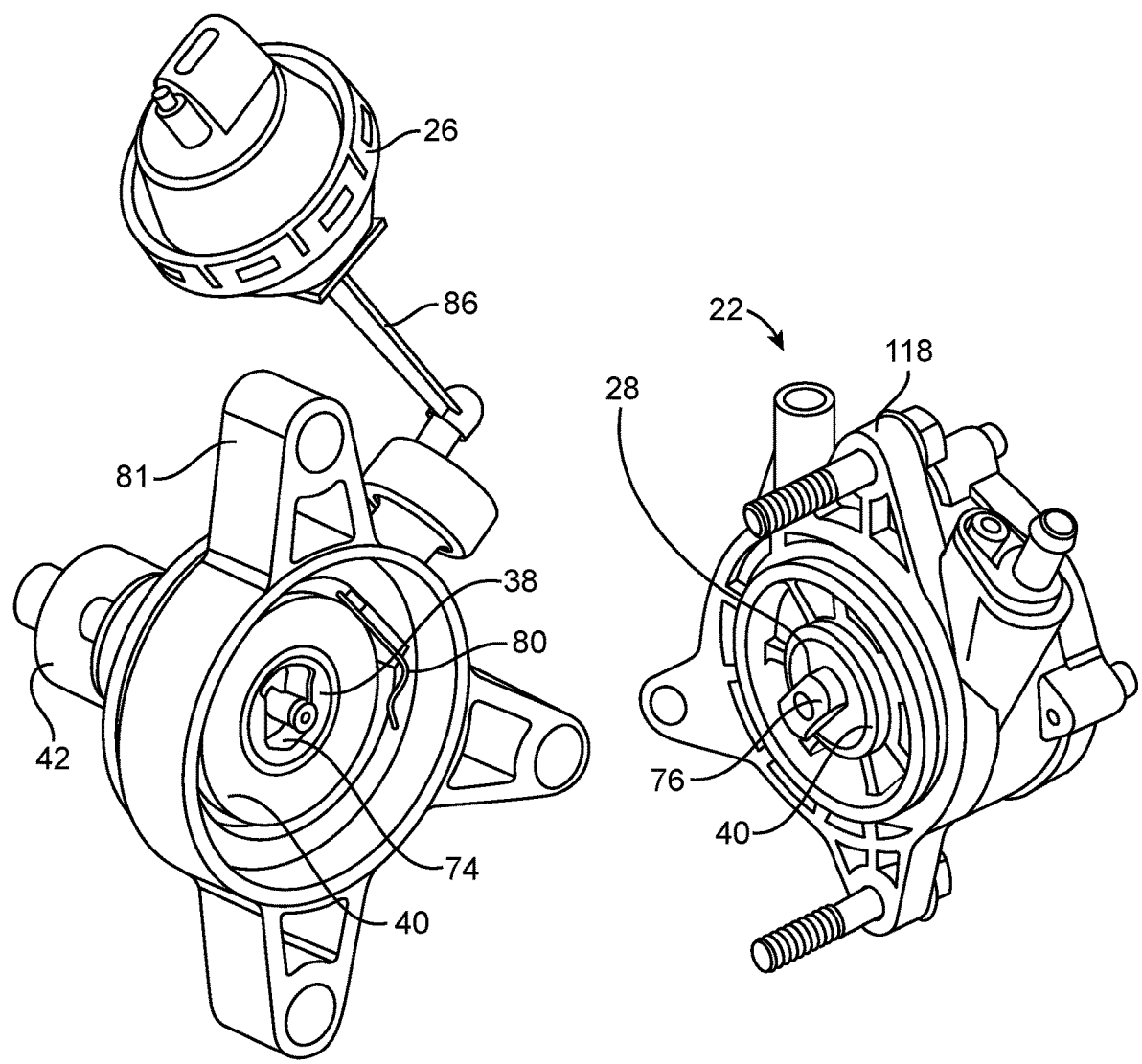
FIG. 8 is another perspective exploded view of the assembly shown in FIG. 2.
Figure 10:
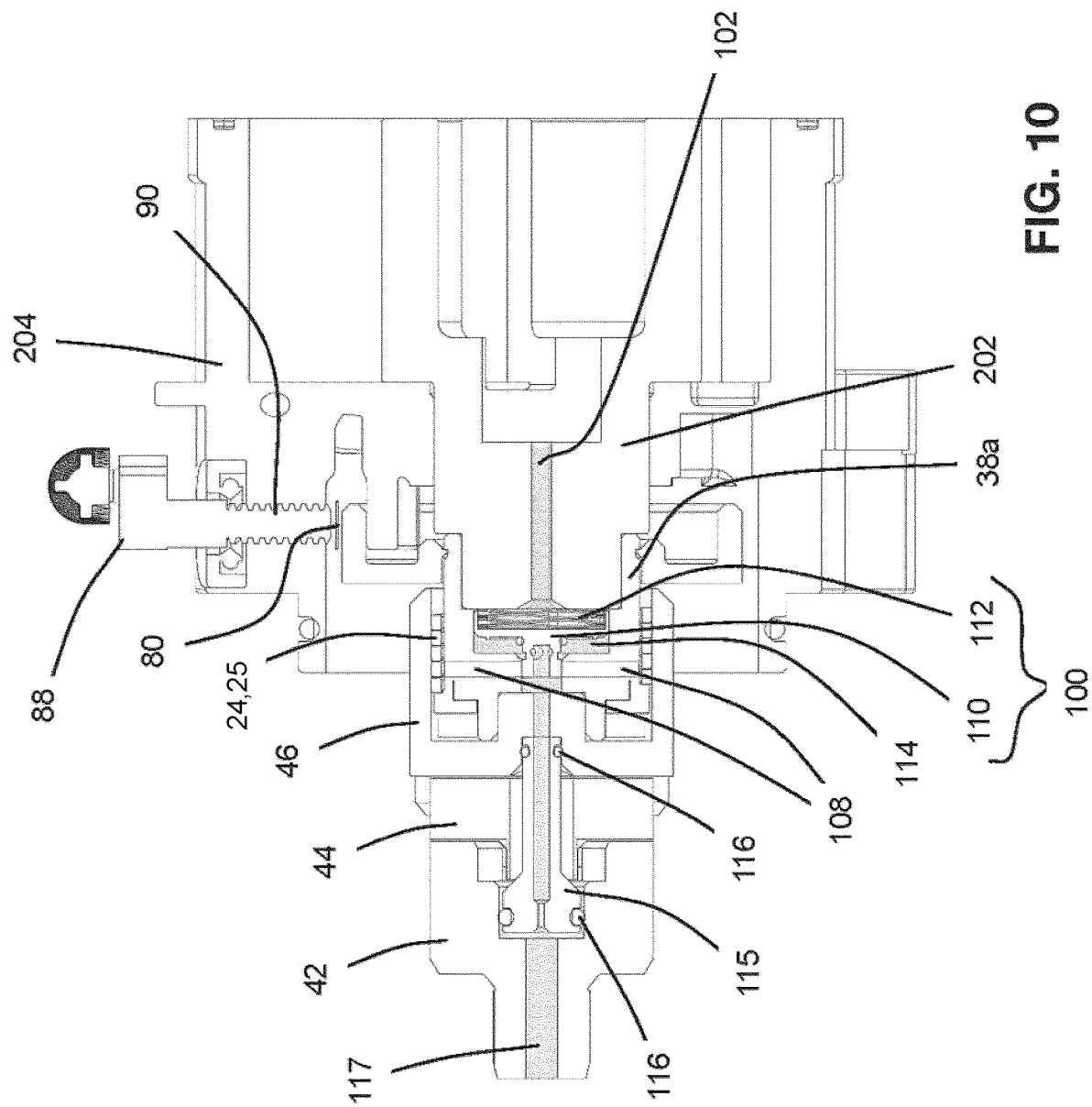
FIG. 10 is a sectional side elevation view of an alternative embodiment of the assembly.

Also as can be seen in FIGS. 3 and 8, the first system housing portion 81 may be a separate member that mounts to a housing member 118 for the vacuum pump 22 via a plurality of fasteners (not shown). (The housing member 118 may also be referred to as a second system housing portion). FIG. 10 shows a vacuum pump 120 that is integrated with certain other components of the assembly 20 more fully. For example, in FIG. 10, the rotor and the second driver portion are integral with one another and are shown at 202 and may be formed from a single block of material, and the first system housing member 81 and the vacuum pump housing member 118 may together be formed from a single block of material and shown at 204.

Figure 12:
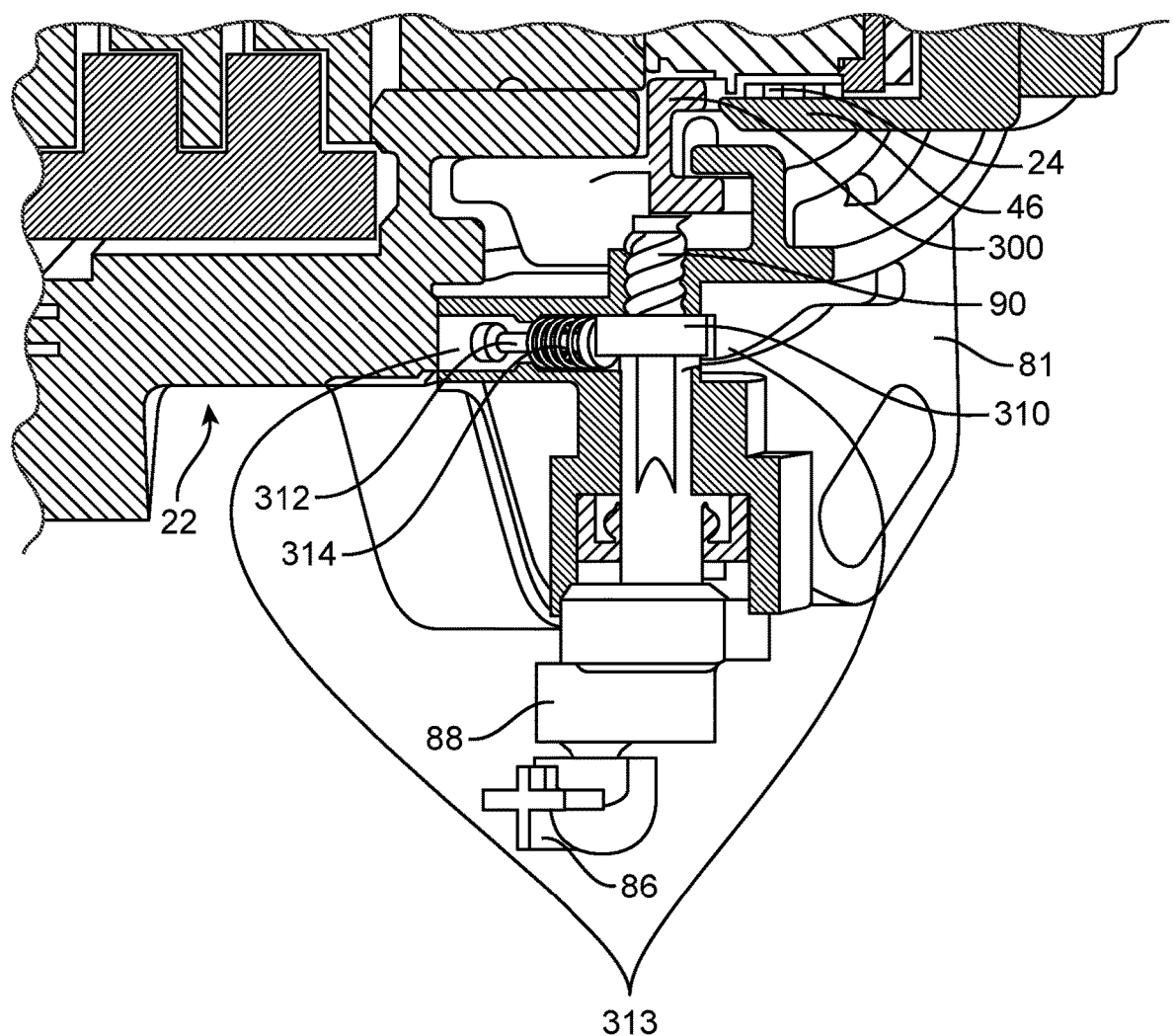
FIG. 12 is a sectional perspective view of another alternative embodiment of the assembly.

FIG. 12 shows an alternative arrangement for controlling the flow of oil to the vacuum pump 22, in which the leadscrew 90 has an oil control valve engagement cam 310 fixedly connected thereto. The cam 310 is engaged with an oil control valve member 312, which is movable between a first valve member position (FIG. 12) in which the valve member 312 permits oil flow in the oil flow path (i.e. to the vacuum pump 22), and a second valve member position in which the valve member 312 prevents oil flow in the first oil flow path. The oil flow path is shown at 313. The oil control valve member 312 is biased towards the second valve member position by a valve member biasing member 314.

Figure 13B:
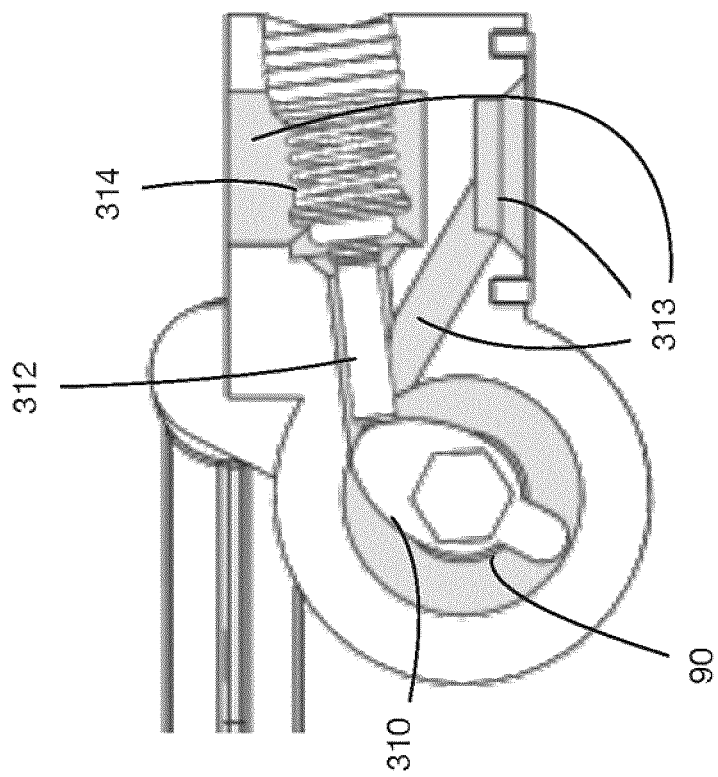
FIG. 13B is a sectional end view of the leadscrew shown in FIG. 13A when the vacuum actuator is in a high-pressure position.
Figure 13A:
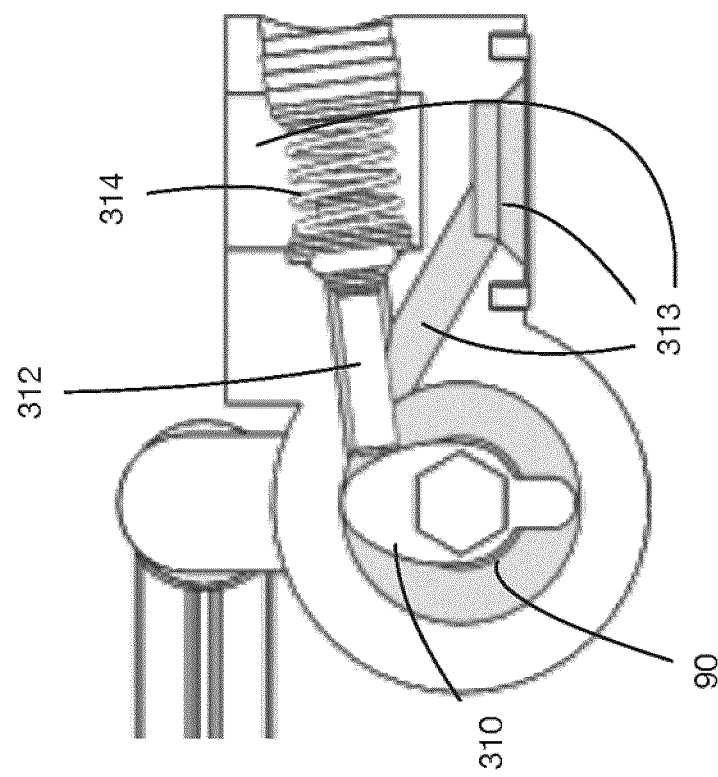
FIG. 13A is a sectional end view of a leadscrew when the vacuum actuator is in a low-pressure position.
Figure 14:
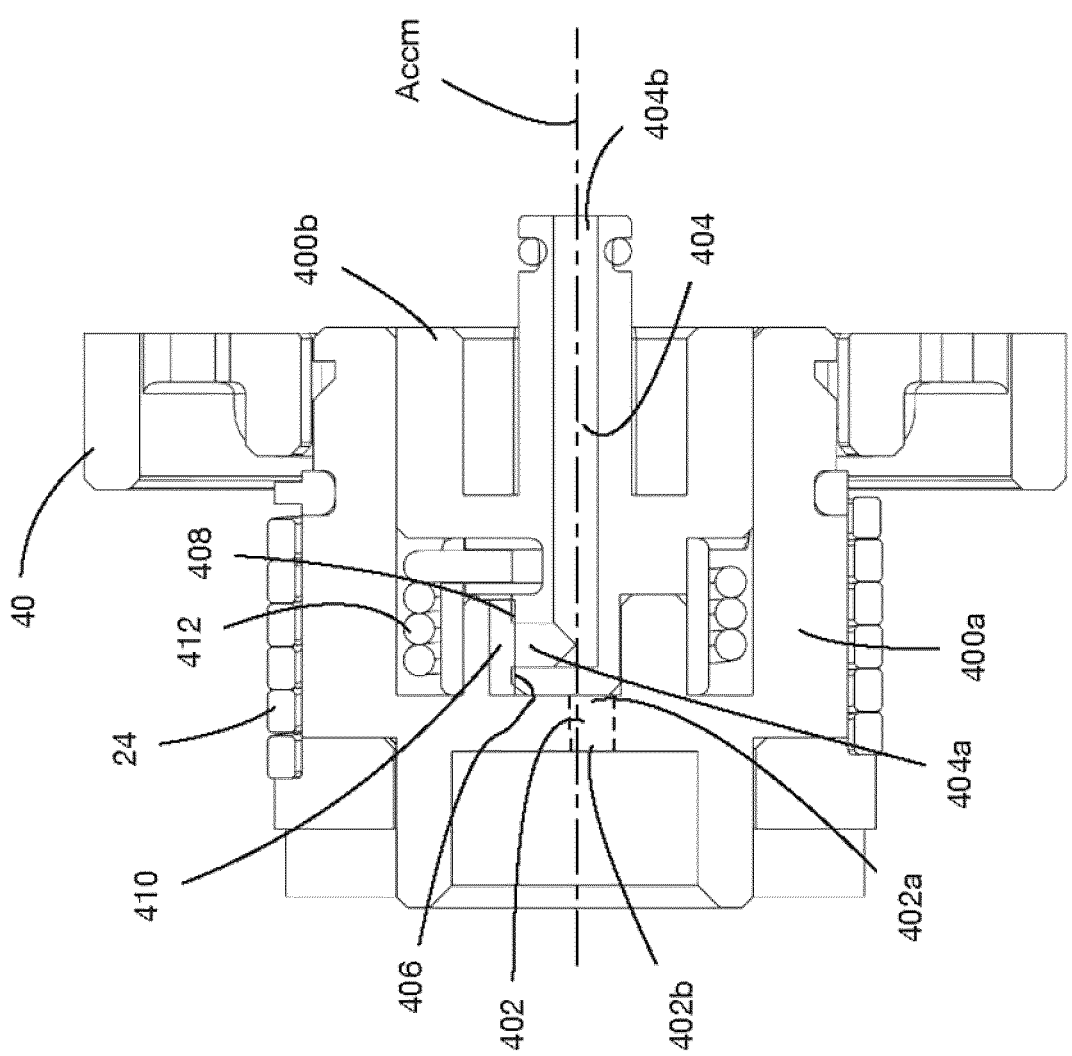
FIG. 14 is a sectional side elevation view of an oil flow control arrangement alternative to that shown in FIGS. 9A and 9B.
Figure 15:
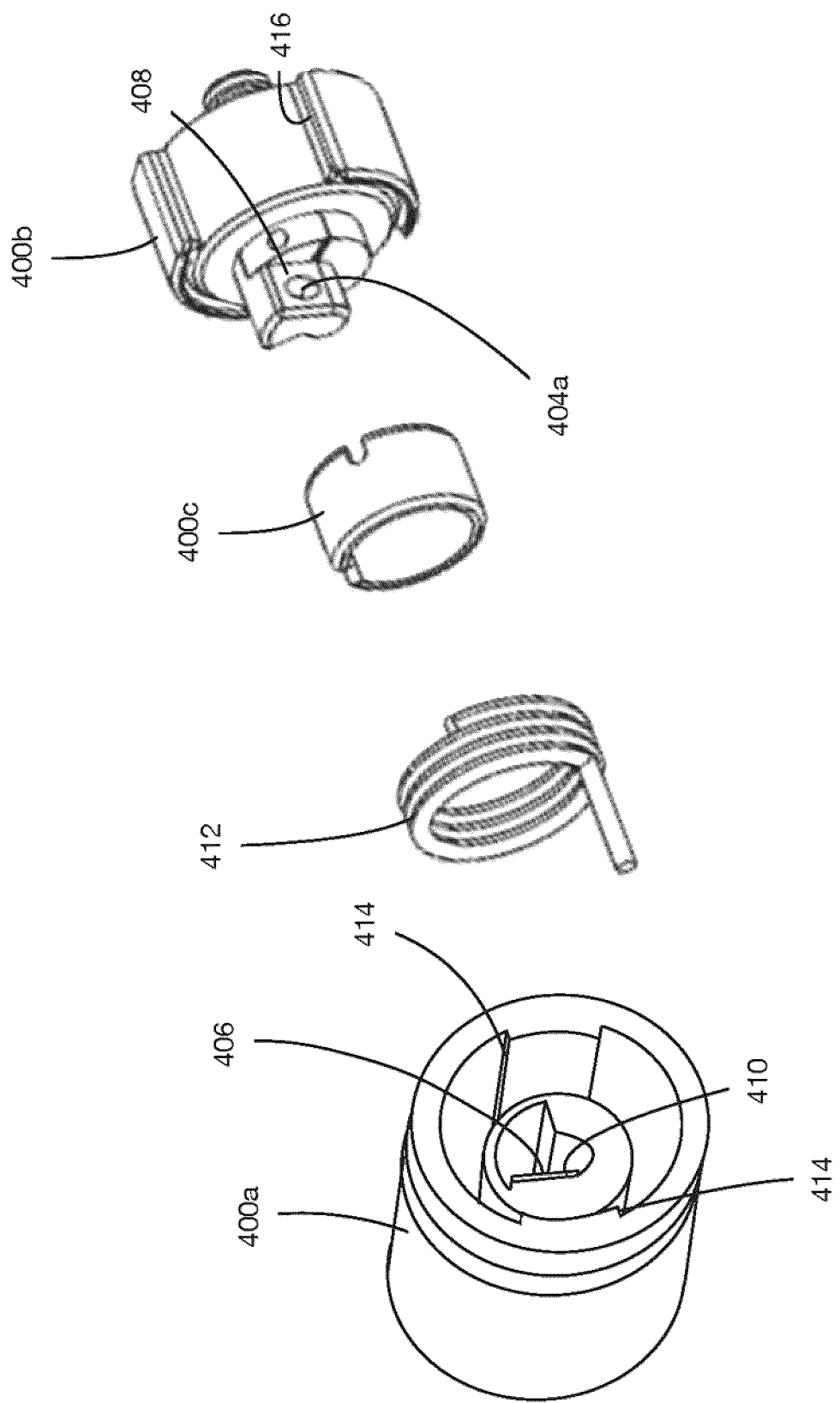
FIG. 15 is a perspective exploded view of the oil flow control arrangement shown in FIG. 14.
Figure 16B:
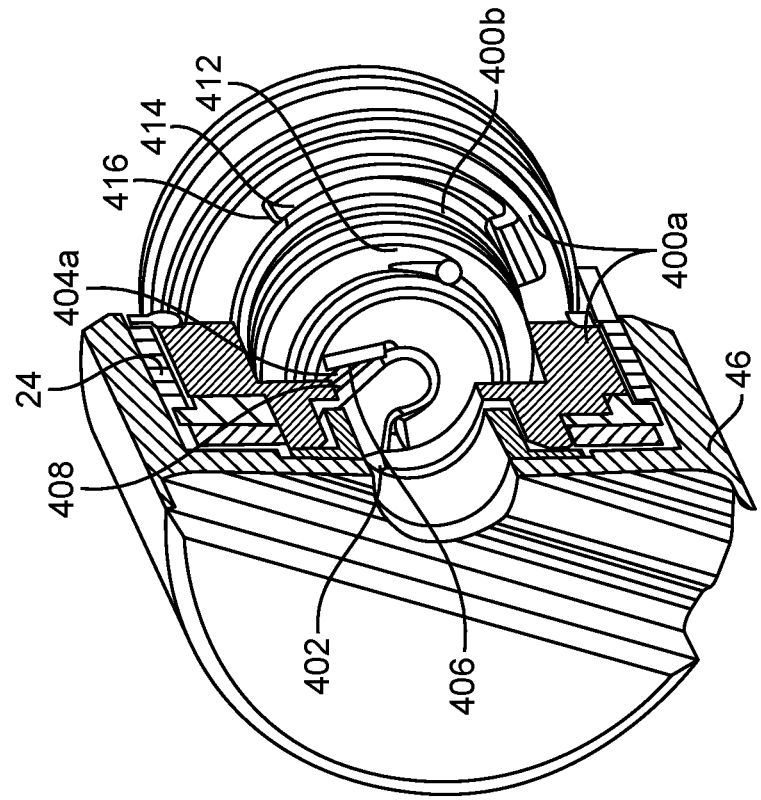
FIG. 16B is a sectional perspective view of the assembly showing the oil flow control arrangement shown in FIG. 14 in an oil flow position to prevent oil flow therethrough.
Figure 16A:
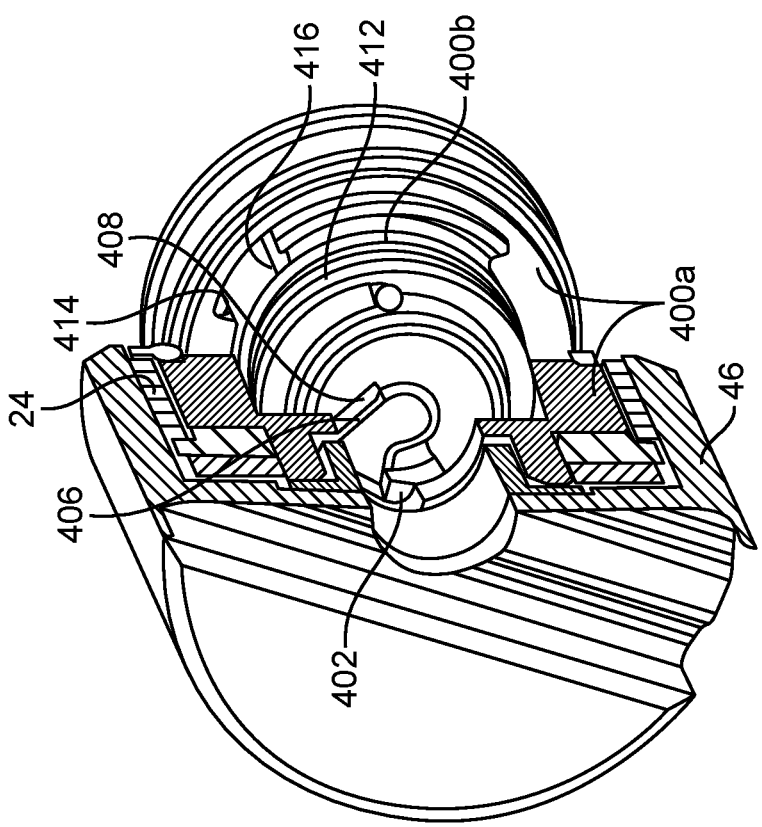
FIG. 16A is a sectional perspective view of the assembly showing the oil flow control arrangement shown in FIG. 14 in a sealing position to prevent oil flow therethrough.

FIGS. 13A and 13B show the leadscrew 90 in section to show the cam 310 and the valve member 312. FIG. 13A shows the position of the leadscrew 90 and the cam 310 when there is sufficient vacuum in the conduit 30 (FIG. 3) to disconnect the camshaft 14 from the vacuum pump 22. As can be seen, the cam 310 is in a valve member closure position, which permits the valve member biasing member 314 to move the valve member 312 to the second valve member position to prevent oil flow to the vacuum pump 22. When there is insufficient vacuum in the conduit 30 (FIG. 3), the vacuum actuator 26 causes the leadscrew 90 to rotate, which drives the cam 310 to the position shown in FIG. 13B, which, in turn moves the valve member 312 to the first valve member position.

FIGS. 14, 15, 16A and 16B show another alternative oil flow control arrangement. In the embodiment shown in FIG. 14, the driver includes a first driver portion 400a and a second driver portion 400b that is rotationally movable relative to the first driver portion 400a.

The first driver portion 400a is similar to the first driver portion 38a, and receives torque from the wrap spring clutch 24 for transfer to the vacuum pump rotor 28. The first driver portion 400a has a first oil flow path 402 which has a first end 402a, and a second end 402b that is fluidically connected to an oil source (e.g. oil source 104 shown in FIGS. 9A and 9B). The second driver portion 400b has a second oil flow path 404 therethrough, which has a first end 404a, and a second end 404b that is fluidically connected to the vacuum pump 22. A first seal surface 406 is provided on the first driver portion 400a and a second seal surface 408 is provided on the second driver portion 400b. The first sealing surface 406 is engageable with the second sealing surface 408 to prevent oil flow through the second oil flow path 404 into the vacuum pump 22. In the embodiment shown, the second seal surface 408 surrounds the first end 404a of the second oil flow path 404 and the first seal surface 402 is a generally planar surface on a rubber member 410.

The first driver portion 400a is rotatable relative to the second driver portion 400b between a first, sealing position (FIG. 16A), in which the first sealing surface 406 is engaged with the second sealing surface 408 to prevent oil flow through the second oil flow path 404 into the vacuum pump 22, and a second, oil flow position (FIG. 16B) in which the first sealing surface 406 is disengaged with the second sealing surface 408 to fluidically connect the first and second oil flow paths 402 and 404 so as to permit oil flow through the second oil flow path 404 into the vacuum pump 22.

It will be noted that the seal surfaces 406 and 408 are free of any portions that extend purely in the radial plane, which is the plane that is perpendicular to the axis of rotation Accm of the driver portions 400a and 400b. As a result, when the first and second driver portions 400a and 400b rotate relative to one another to bring the seal surfaces 406 and 408 into or out of engagement with one another, there is substantially no rubbing between the seal surfaces 406 and 408, and as a result, wear on the surfaces 406 and 408 is reduced.

A driver biasing member 412 is provided between the first and second driver portions 400a and 400b, which biases the first biasing member 400a towards the sealing position. Thus, when the vacuum pump 22 is off and the first and second driver portions 400a and 400b are stationary, the driver biasing member 412 maintains engagement between the seal surfaces 406 and 408 to prevent oil flow into the vacuum pump 22.

As described above, when there is insufficient vacuum in the vacuum conduit 30, the driver portion 400a is driven to rotate by the camshaft 14 (via the wrap spring clutch 24). Due to one or more of: inertia in the vacuum pump rotor 28, frictional resistance to rotation of the rotor 28 and resistance to rotation due to any load engaged by the rotor (i.e. air in the vacuum pump to be evacuated), the second driver portion 400b will resist movement. As a result, the first driver portion 400a will rotate relative to the second driver portion 400b, thereby disengaging the seal surfaces 406 and 408 from one another, which in turn permits oil flow immediately into the vacuum pump 22. In some embodiments, the driver biasing member 412 has a relatively low spring rate, and easily permits relative movement between the first and second driver portions 400a and 400b. In such embodiments, after a selected amount of relative rotation of the first driver portion 400a relative to the second driver portion 400b, a first drive torque transfer surface 414 (FIG. 15 on the first driver portion 400a will engage a second drive torque transfer surface 416 on the second driver portion 400b. As a result, any subsequent amount of drive torque is transferred from the first driver portion 400a to the second driver portion 400b via the drive torque transfer surfaces 414 and 416.

A sleeve 400c that effectively forms part of the second driver portion 400b may be provided to support the spring and to align the first and second driver portions 400a and 400b relative to one another.

The vacuum pump rotor 28 and vacuum pump 22 may alternatively be any accessory that incorporates a rotor that is to be driven by the driver portion 400b.

System Example

Figure 25:
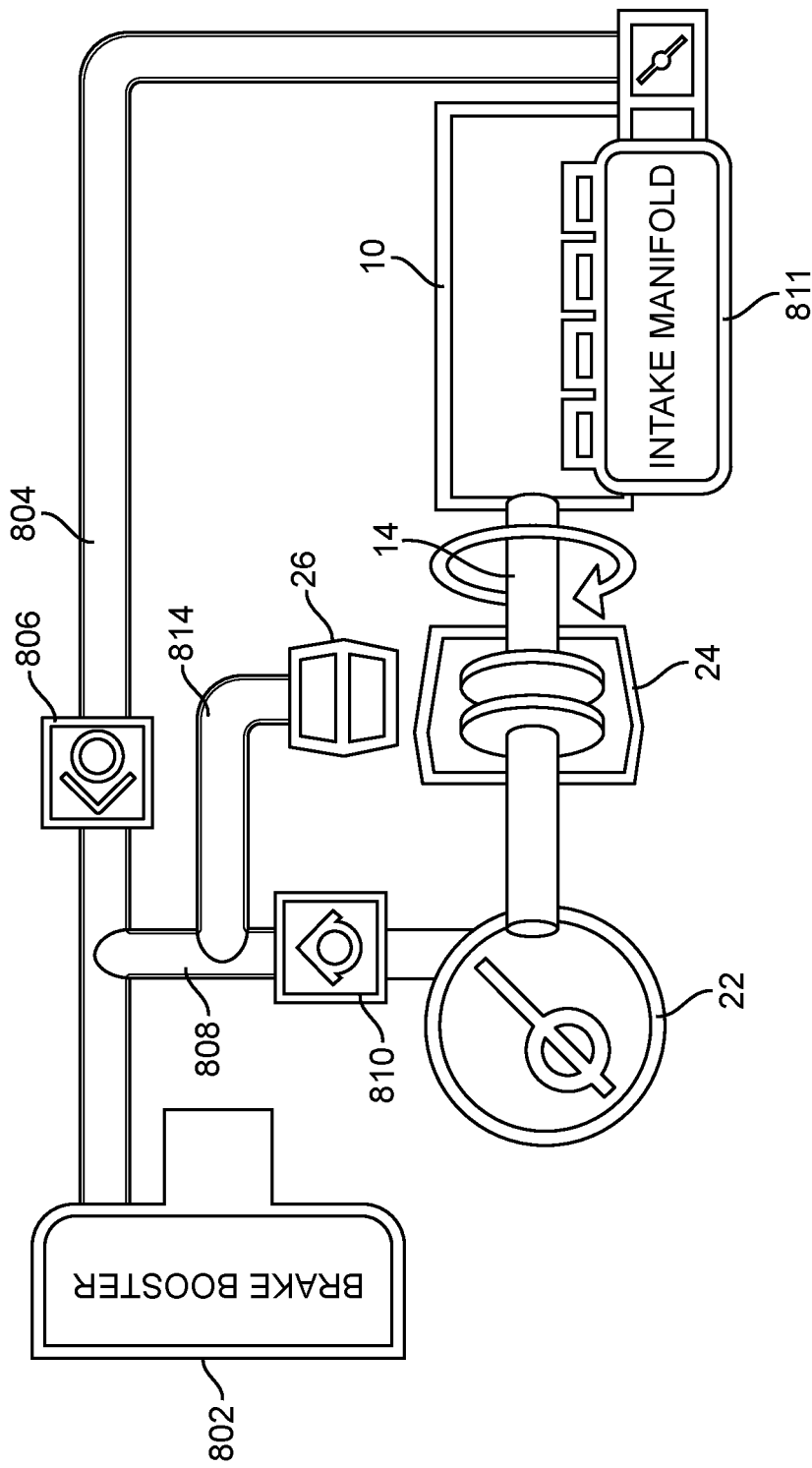
FIG. 25 is a system block diagram of a vacuum system application.

FIG. 25 shows an example of a vehicular vacuum system 800. The engine 10 is connected to a brake booster 802 via a first conduit 804 in which a check valve 806 can be installed. The engine 10 includes an intake manifold 811 that provides the primary source of vacuum. Any of the embodiments of assembly 20 can be connected to the engine 10 and the brake booster 802. The clutch 24 can be connected to an engine shaft such as a camshaft or any other suitable rotary power takeoff provided by the engine. The vacuum pump 22 is connected to the first conduit 804 (upstream of the check valve 806, if any) via a second conduit 808. A check valve 810 can be installed in the second conduit 808. The vacuum actuator 26 is also connected to the first conduit 804 (upstream of the check valves 806, 810, if any) via a third conduit 814. In one example application of the system (1.0 litre direct-gas-injection turbocharged engine with start/stop system) the intake manifold 811 provided sufficient vacuum for the brake booster 802 about 94-97% of the time in standardized test cycles, leaving the assembly 20 with a 3-6% duty cycle. This result yielded a fuel efficiency saving estimate of about 1.5% over a non-clutched vacuum pump. The savings will, of course, depend on the specific application.

Other advantages and features will be understood by a person of skill in the art upon review of the present disclosure.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A vacuum generating assembly, comprising:
   a rotary input member connectable to an engine rotary power takeoff;
   a vacuum pump having a rotor that is rotatable to generate a vacuum;
   a wrap spring clutch coupling the rotary input member and the vacuum pump rotor, wherein the wrap spring clutch is positionable in an engaged position, in which the wrap spring clutch operatively connects the rotary input member and the vacuum pump rotor, and a disengaged position, in which the wrap spring clutch operatively disconnects the rotary input member and the vacuum pump rotor; and
   a vacuum actuator including a vacuum actuator housing, a movable separation wall in the vacuum actuator housing, and an actuator rod that mechanically operatively connects the movable separation wall to a brake, wherein the housing is connectable to a vacuum conduit, wherein the brake is connectable to a clutch control member that is operatively connected to the wrap spring clutch, wherein the movable separation wall is movable, based on air pressure in the vacuum conduit, to move the vacuum actuator between a low-pressure position in which the actuator rod moves the brake to position the wrap spring clutch in the disengaged position, and a high-pressure position in which the actuator rod moves the brake to position the wrap spring clutch in the engaged position, and wherein the brake is biased to a non-braking position.

2. An assembly according to claim 1, wherein the wrap spring clutch is biased towards the engaged position.

3. An assembly according to claim 1, wherein the rotary power take-off is a camshaft.

4. An assembly according to claim 1, further comprising:
   the clutch control member connected to the wrap spring clutch; and
   wherein the brake is positionable in a non-braking position in which the brake permits the clutch control member to be driven by the rotary power takeoff, thereby permitting the wrap spring clutch to remain in the engaged position, and in a braking position in which the brake retards rotation of the clutch control member relative to the rotary power takeoff, bringing the wrap spring clutch to the disengaged position,
   wherein movement of the vacuum actuator to the low-pressure position positions the brake in the non-braking position, and movement of the vacuum actuator to the high-pressure position positions the brake in the braking position.

5. An assembly according to claim 4, wherein the brake includes a leadscrew and a crank connected to rotate the leadscrew, wherein the vacuum actuator rotates the crank through a selected arc.

6. An assembly according to claim 4, including means for providing the assembly with setpoint hysteresis.

7. An assembly according to claim 6, wherein the hysteresis means is provided by provisioning a lobe on the clutch control member which interacts with the brake.

8. An assembly according to claim 6, wherein the hysteresis means is provided by a bistable spring band which interacts with the brake.

9. An assembly according to claim 6, including a vacuum conduit connecting the vacuum actuator to a vacuum reservoir, wherein the hysteresis means is provided by installing a restrictor and a check valve in parallel in the vacuum conduit.

10. An assembly according to claim 1, including means for limiting transfer of torque from the rotary power take-off to the vacuum pump rotor.

11. An assembly according to claim 10, where the torque-limiting means is provided by a helical coil disposed between the wrap spring clutch and the vacuum rotor, wherein the helical coil is preloaded onto a rotor shaft and applying a torque to an end of the helical coil greater than the preload amount causes the helical coil to slip relative to the rotor shaft.

12. A pump assembly, comprising:
a rotary input member connectable to an engine rotary power takeoff;
a pump having a rotor that is rotatable to generate suction;
a clutch coupling the rotary input member and the pump rotor, wherein the clutch is positionable in an engaged position, in which the clutch operatively connects the rotary input member and the pump rotor, and a disengaged position, in which the clutch operatively disconnects the rotary input member and the pump rotor; and
an actuator operatively connected to the clutch, wherein the actuator is movable, between a first position in which the actuator positions the clutch in the disengaged position, and a second position in which the actuator positions the clutch in the engaged position;
means for providing the assembly with setpoint hysteresis; and
a torque limiting clutch that limits torque transfer to the rotor when the clutch operatively connects the rotary input member to the rotor.

13. An assembly according to claim 12, wherein the rotary power take-off is a camshaft and the clutch is a wrap spring clutch biased towards the engaged position, and further including a clutch control member that holds an end of the wrap spring clutch, and a brake that is positionable in a non-braking position in which the brake permits the clutch control member to be driven by the camshaft, thereby permitting the wrap spring clutch to remain in the engaged position, and in a braking position in which the brake retards rotation of the clutch control member relative to the camshaft, bringing the wrap spring clutch to the disengaged position, wherein the brake includes a leadscrew and a crank connected to rotate the leadscrew, wherein the actuator rotates the crank through a selected arc.

14. An assembly according to claim 13, including a driver that transfers torque between the camshaft and the rotor, wherein the driver includes a first driver portion and a second driver portion,
wherein the torque limiting clutch is the wrap spring clutch having at least one coil having a first helical end, and wherein the first driver portion has a torque limiting clutch engagement surface thereon that extends radially and axially and that engages the first helical end,
and wherein the torque limiting clutch has a radially inner or outer surface that is engaged with a complementary radially inner or outer surface on the second driver portion with a selected preload and wherein increasing torque transfer to the first helical end of the torque limiting clutch drives movement of the first helical end in a direction that reduces the preload until the radially inner or outer surface slips on the complementary radially inner or outer surface.

15. A method of operating a vacuum system with an internal combustion engine, wherein the vacuum system includes an engine intake manifold connected to a vacuum reservoir, an oil-supplied vacuum pump having a rotor and which is connected to the vacuum reservoir, and a clutch connected between a rotary power take-off of the engine and the vacuum pump for selectively turning-on and turning-off of the vacuum pump, the method comprising:
operating the engine to generate vacuum via the intake manifold;
engaging the clutch to turn on the vacuum pump when the pressure in a vacuum conduit is above a first pressure setpoint;
disengaging the clutch to turn off the vacuum pump when the pressure in the vacuum conduit is below a second pressure setpoint that is different than the first pressure setpoint; and
limiting torque applied to the vacuum pump by the rotary power take-off when the clutch is engaged by transferring torque to the vacuum pump through a torque limiting clutch,
wherein the vacuum system includes a driver that transfers torque between the rotary power take-off and the rotor, wherein the driver includes a first driver portion and a second driver portion that is movable relative to the first driver portion,
wherein the torque limiting clutch is a wrap spring clutch having at least one coil having a first helical end,
wherein the first driver portion has a torque limiting clutch engagement surface thereon that extends radially and axially and that engages the first helical end,
wherein the torque limiting clutch has a radially inner or outer surface that is engaged with a complementary radially inner or outer surface on the second driver portion with a selected preload and wherein increasing torque transfer to the first helical end of the torque limiting clutch drives movement of the first helical end in a direction that reduces the preload until the radially inner or outer surface slips on the complementary radially inner or outer surface, thereby limiting how much torque can be transferred through the torque limiting clutch, and
wherein the torque limiting clutch includes means for providing the assembly with setpoint hysteresis.

* * * * *